Figure 1:
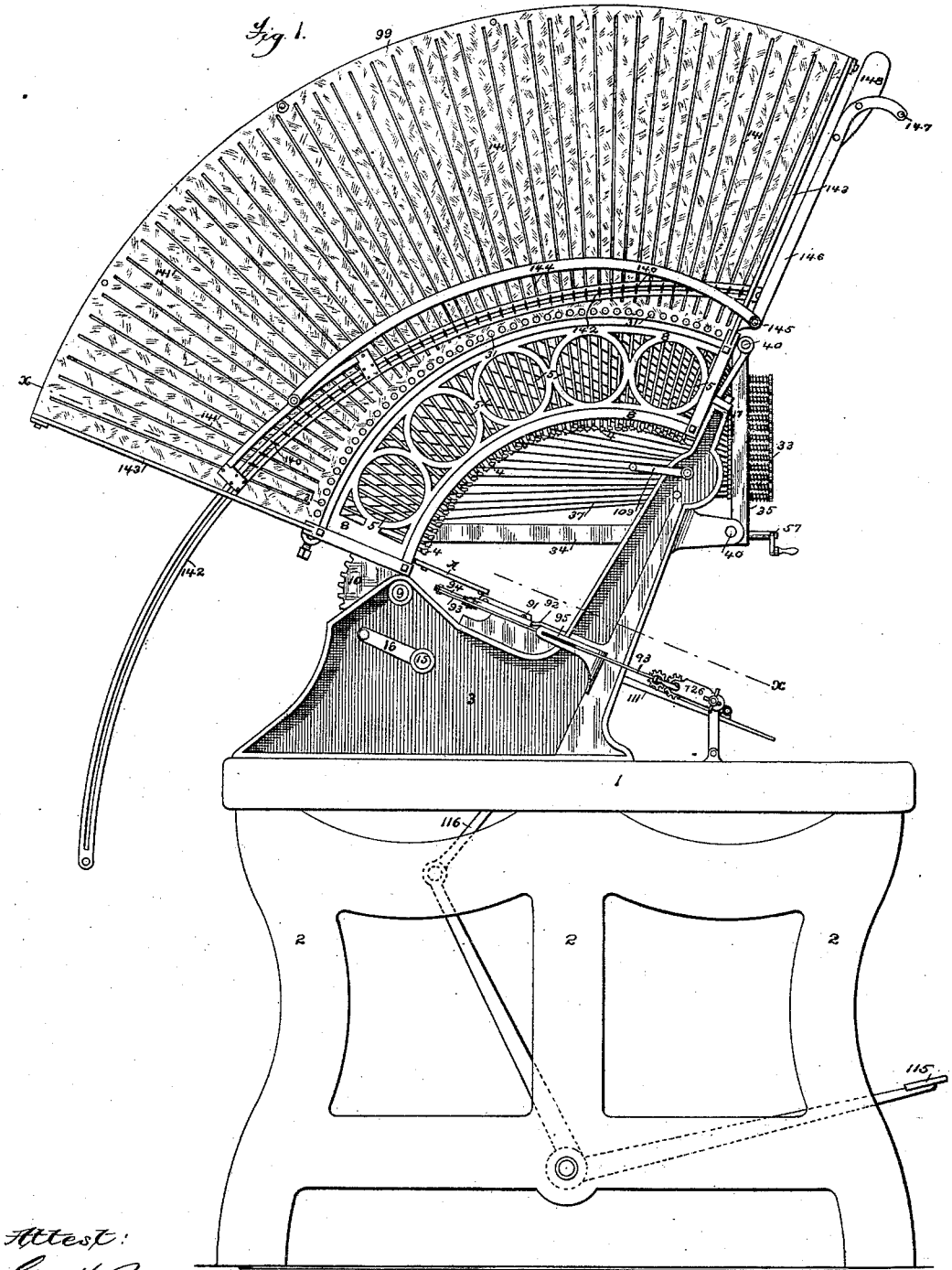

(No Model.) 15 Sheets—Sheet 1.

J. W. SCHUCKERS.
MECHANISM FOR JUSTIFYING COMPOSED LINES OF TYPE.

No. 474,306. Patented May 3, 1892.

(No Model.) 15 Sheets—Sheet 2.
J. W. SCHUCKERS.
MECHANISM FOR JUSTIFYING COMPOSED LINES OF TYPE.
No. 474,306. Patented May 3, 1892.

Attest:
Geo. H. Botts.
Homer Lee

Inventor:
Jacob W. Schuckers
by Munson & Philipp
Attys.

(No Model.)  15 Sheets—Sheet 3.
J. W. SCHUCKERS.
MECHANISM FOR JUSTIFYING COMPOSED LINES OF TYPE.
No. 474,306. Patented May 3, 1892.
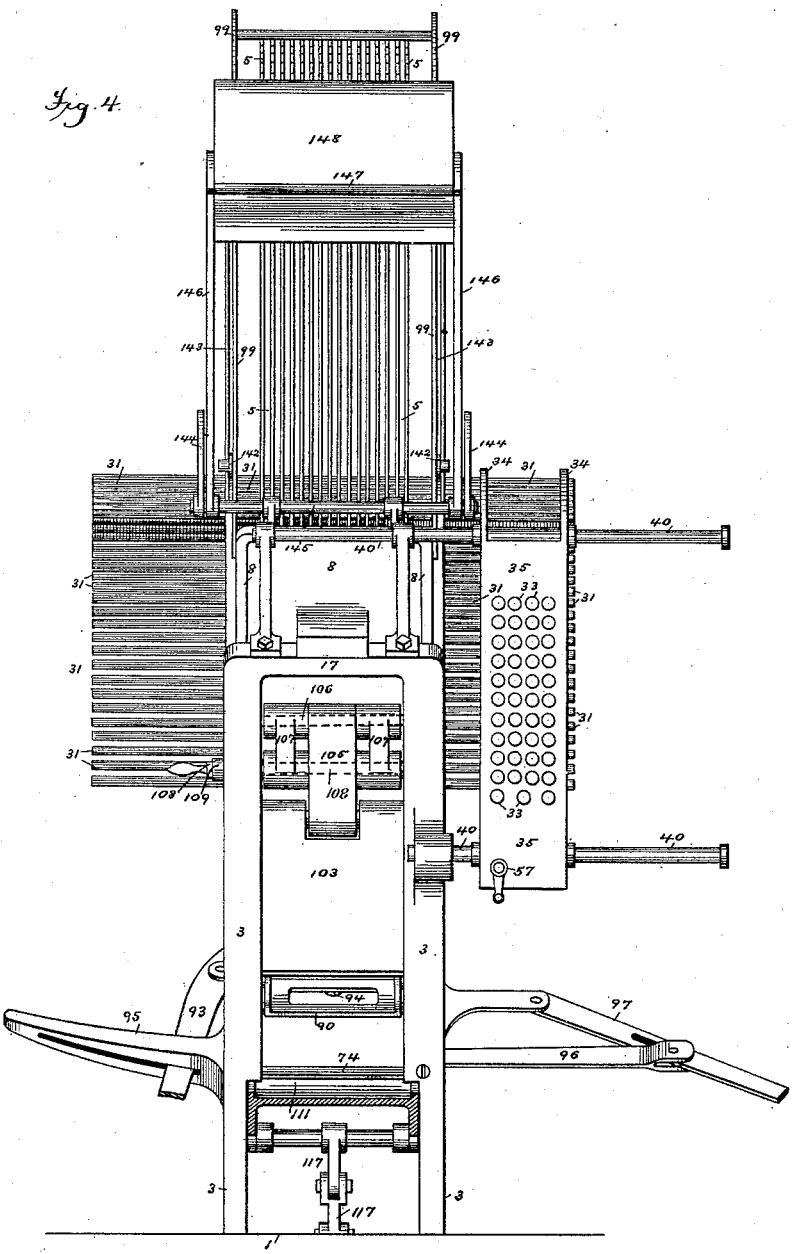

(No Model.) 15 Sheets—Sheet 4.
J. W. SCHUCKERS.
MECHANISM FOR JUSTIFYING COMPOSED LINES OF TYPE.
No. 474,306. Patented May 3, 1892.
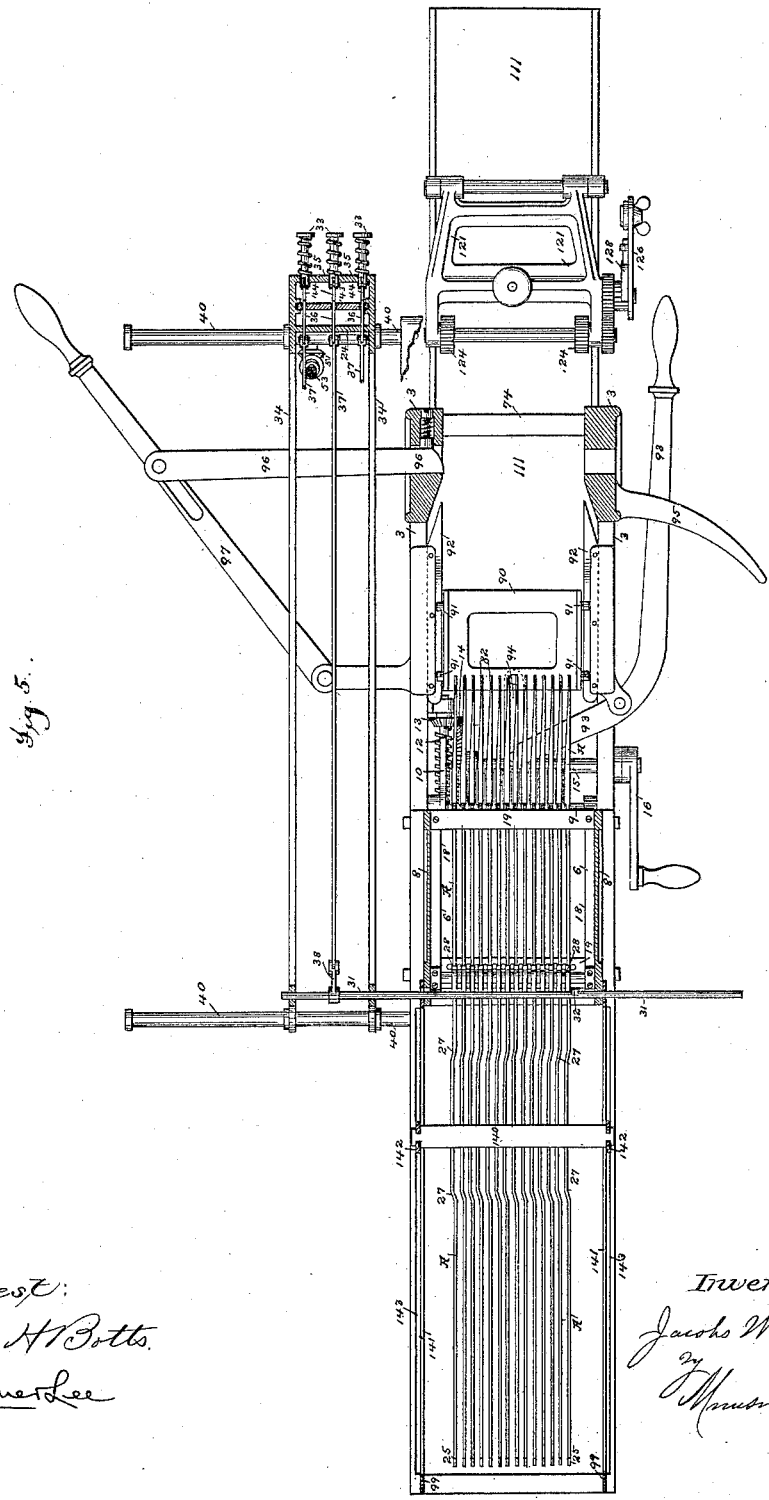

(No Model.)
J. W. SCHUCKERS.
MECHANISM FOR JUSTIFYING COMPOSED LINES OF TYPE.
No. 474,306. Patented May 3, 1892.
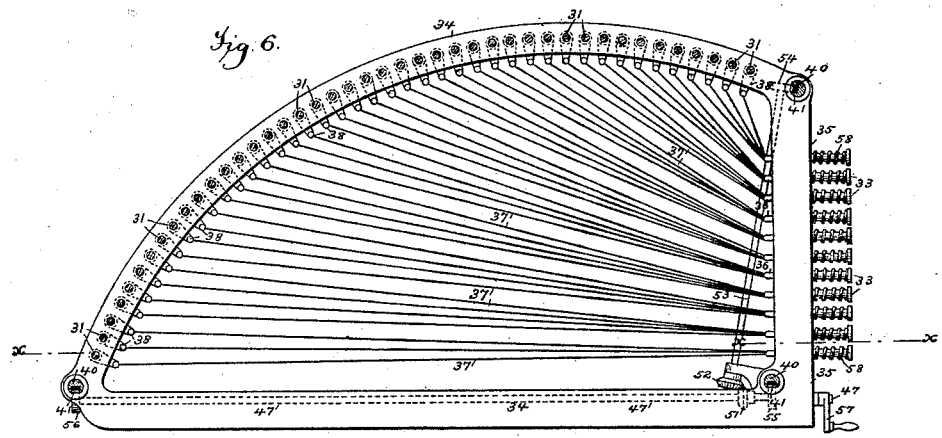
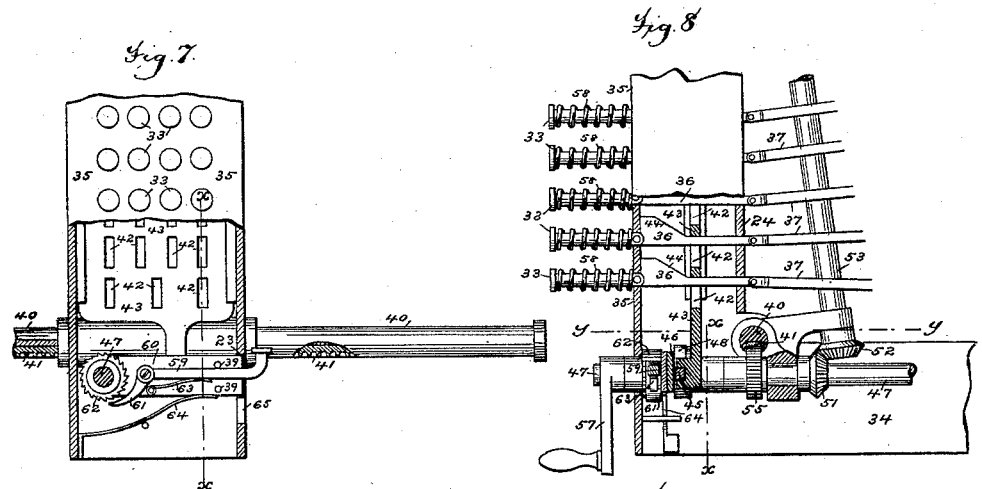
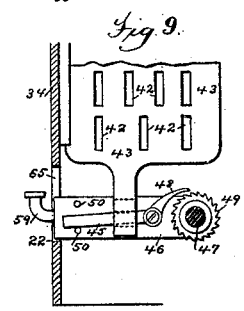
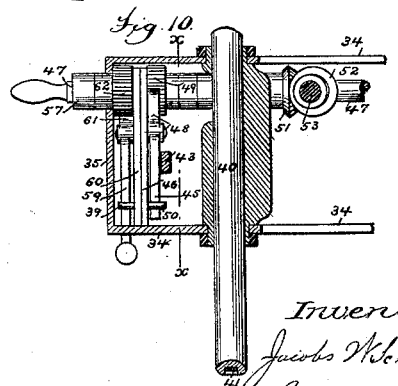
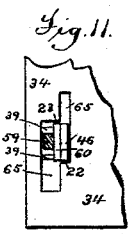
Attest:
Geo. H. Botts
Homer Lee
Inventor:
Jacob W. Schuckers
by
Munsu & Philipp
Attys.

(No Model.)  15 Sheets—Sheet 6.

J. W. SCHUCKERS.
MECHANISM FOR JUSTIFYING COMPOSED LINES OF TYPE.

No. 474,306. Patented May 3, 1892.

Attest:
Geo. H. Botts.
Homer Lee

Inventor:
Jacob W. Schuckers
by
Munn & Phipp
Attys.

(No Model.) 15 Sheets—Sheet 7.
J. W. SCHUCKERS.
MECHANISM FOR JUSTIFYING COMPOSED LINES OF TYPE.
No. 474,306. Patented May 3, 1892.
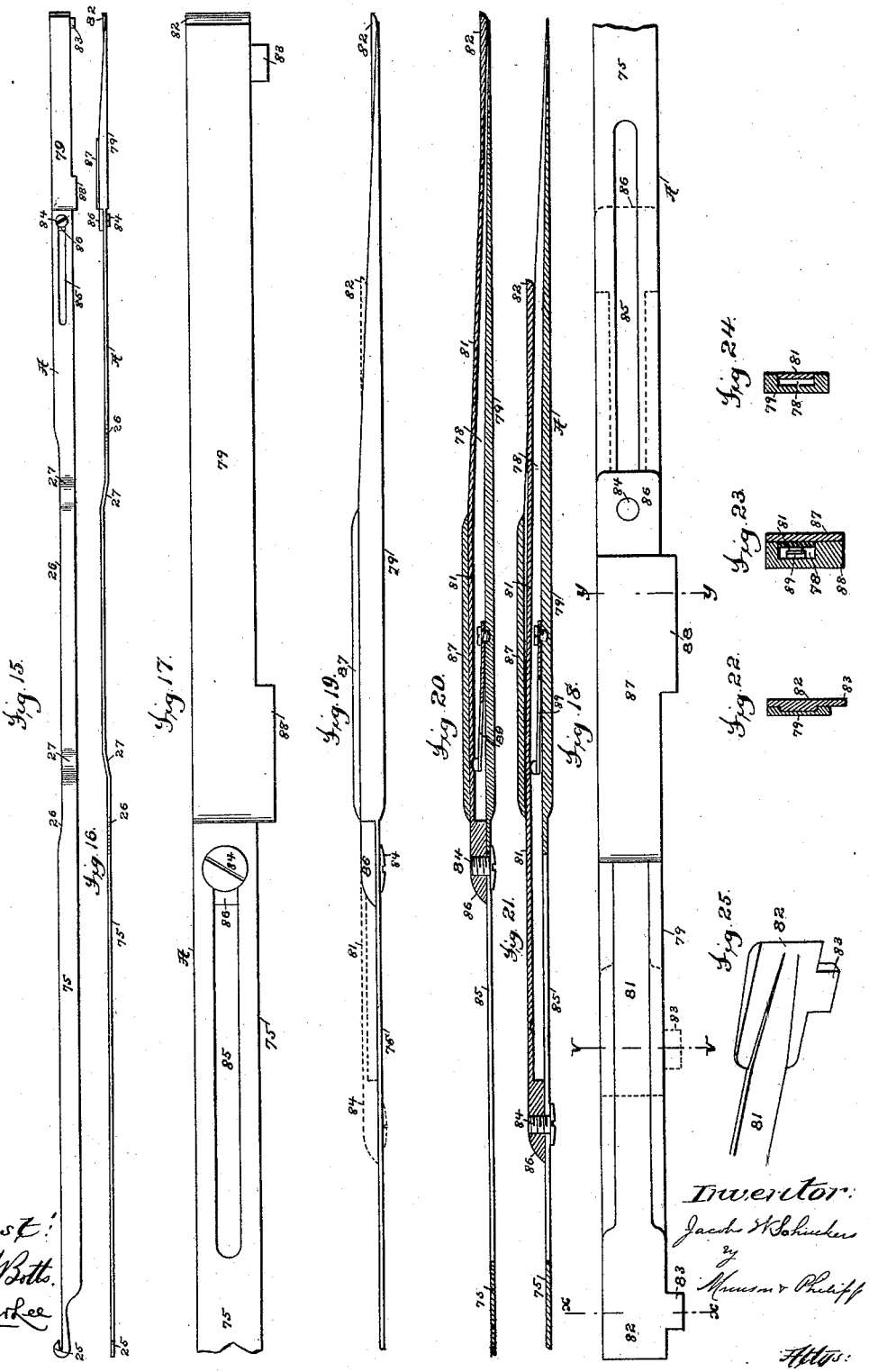

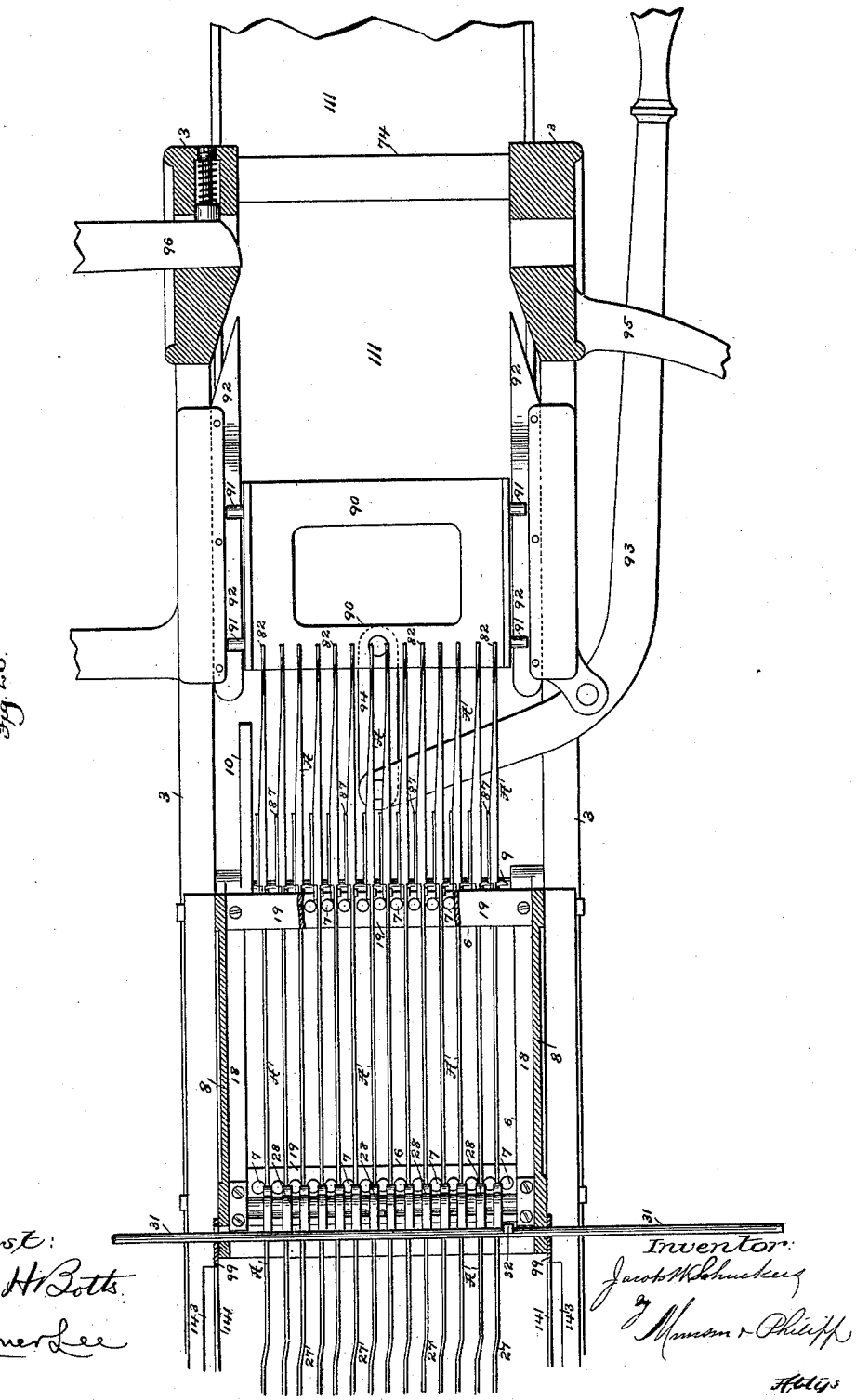

(No Model.)  15 Sheets—Sheet 9.
J. W. SCHUCKERS.
MECHANISM FOR JUSTIFYING COMPOSED LINES OF TYPE.
No. 474,306.  Patented May 3, 1892.
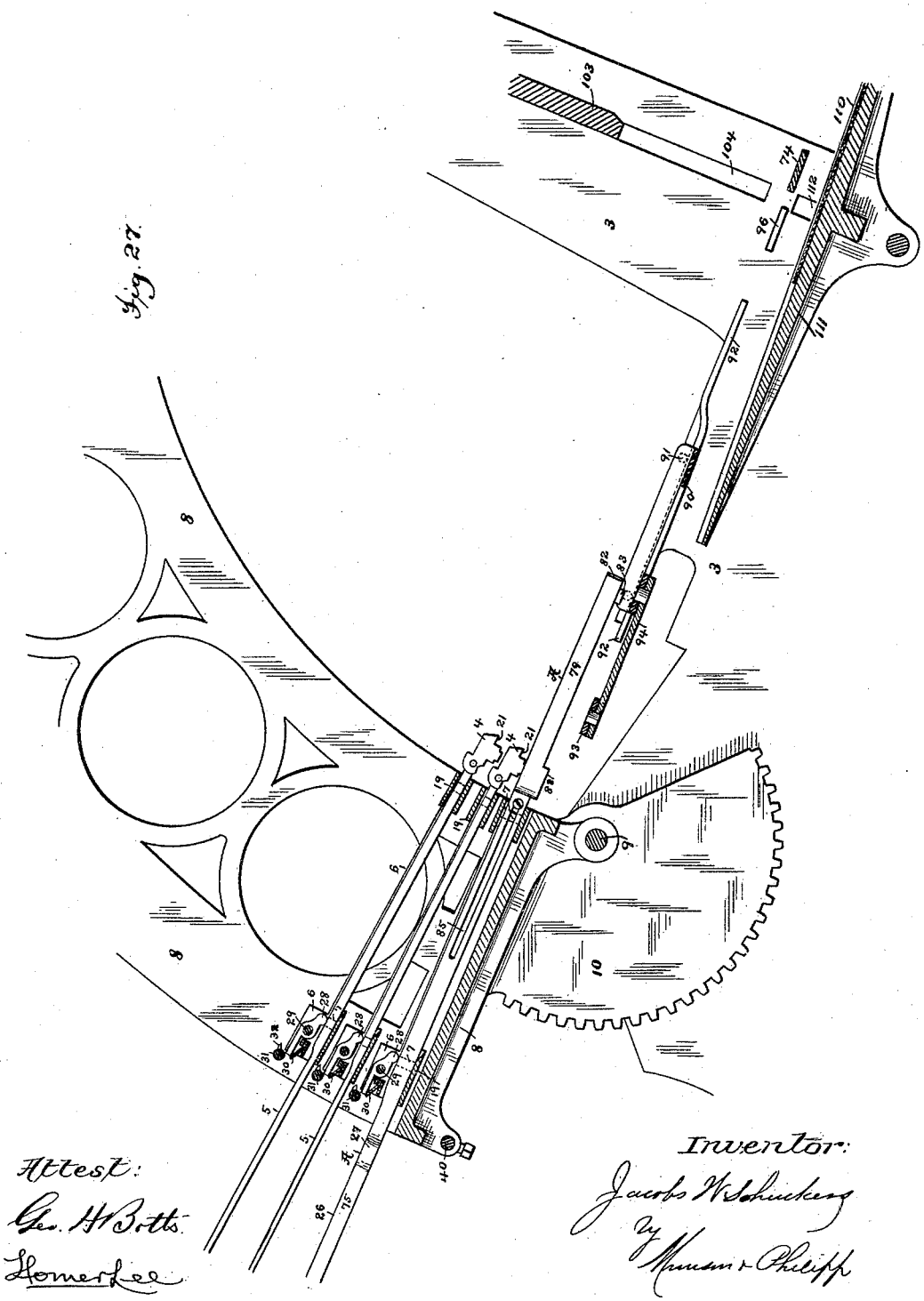

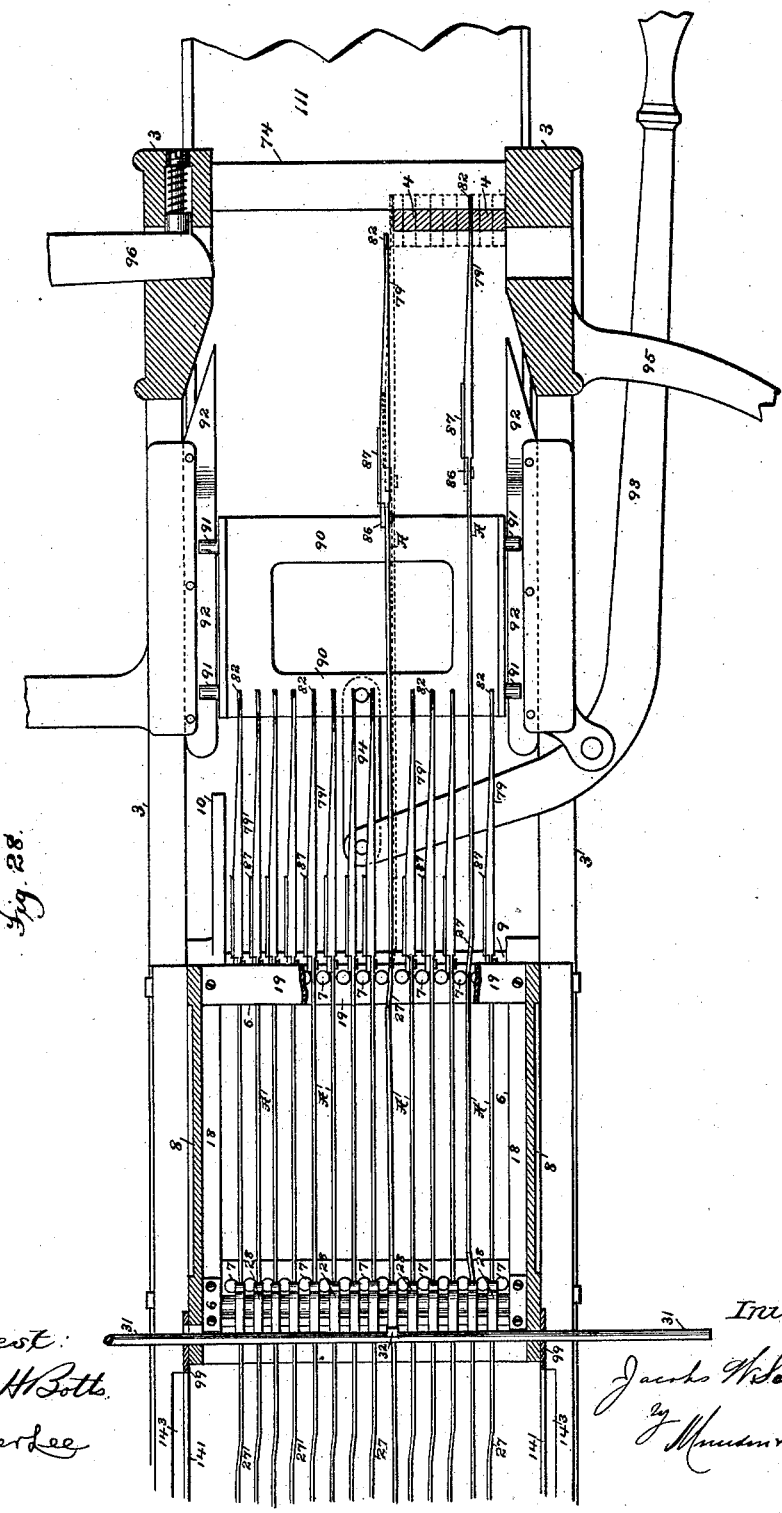

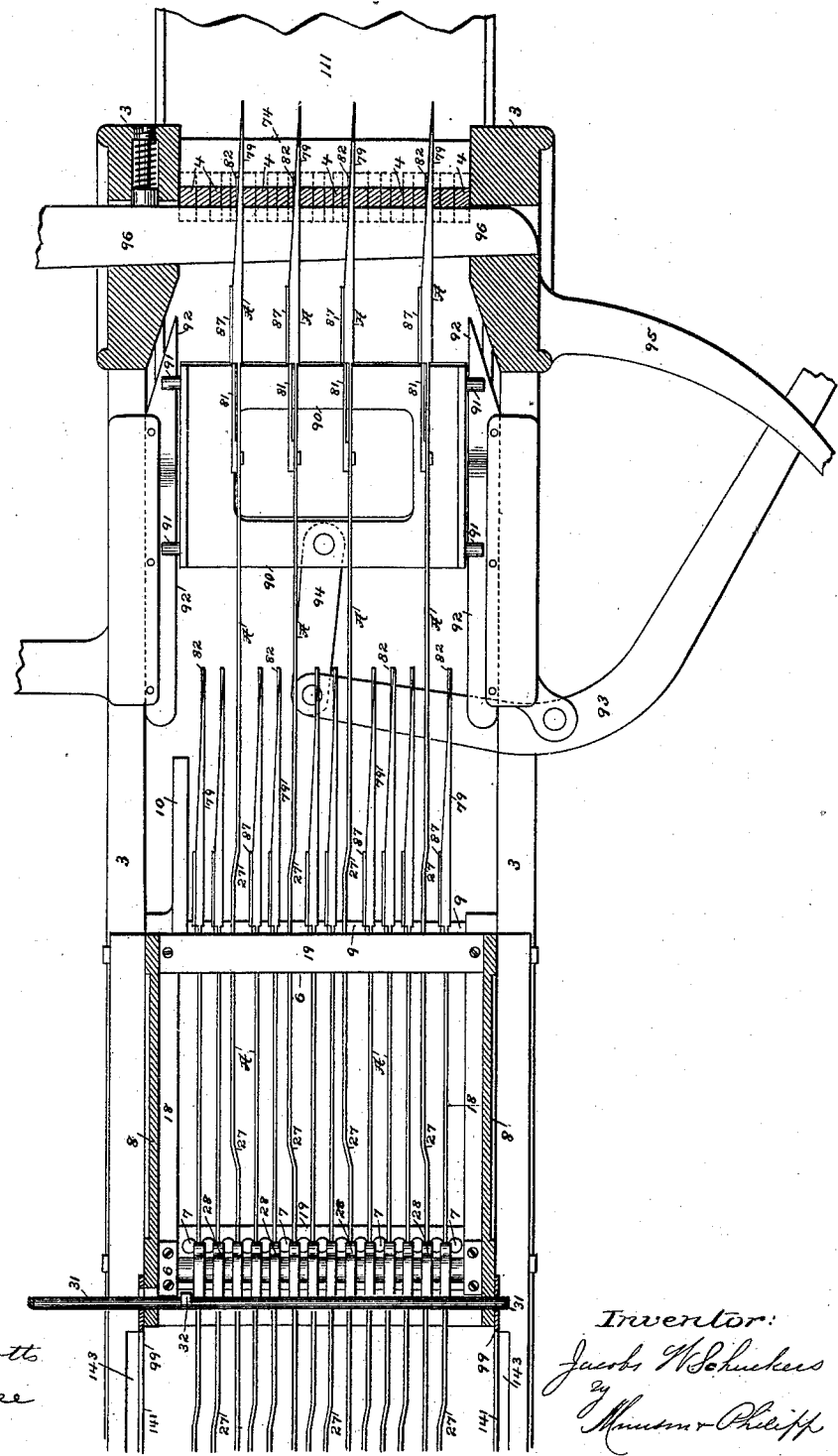

(No Model.) 15 Sheets—Sheet 12.
J. W. SCHUCKERS.
MECHANISM FOR JUSTIFYING COMPOSED LINES OF TYPE.

No. 474,306. Patented May 3, 1892.

Attest.
Geo. H. Botts
Homerkee

Inventor:
Jacob W. Schuckers
by Munson & Philipp
Attys:

(No Model.) 15 Sheets—Sheet 13.
J. W. SCHUCKERS.
MECHANISM FOR JUSTIFYING COMPOSED LINES OF TYPE.
No. 474,306. Patented May 3, 1892.
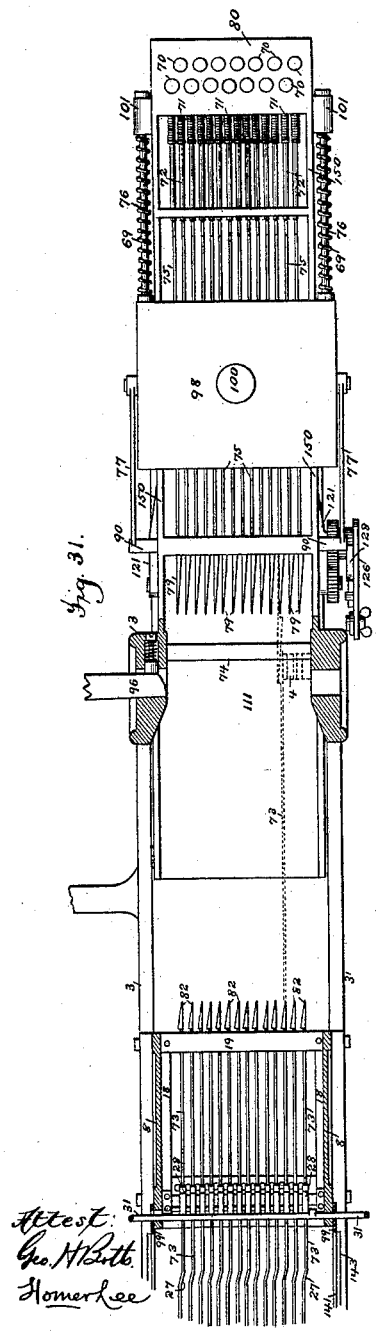
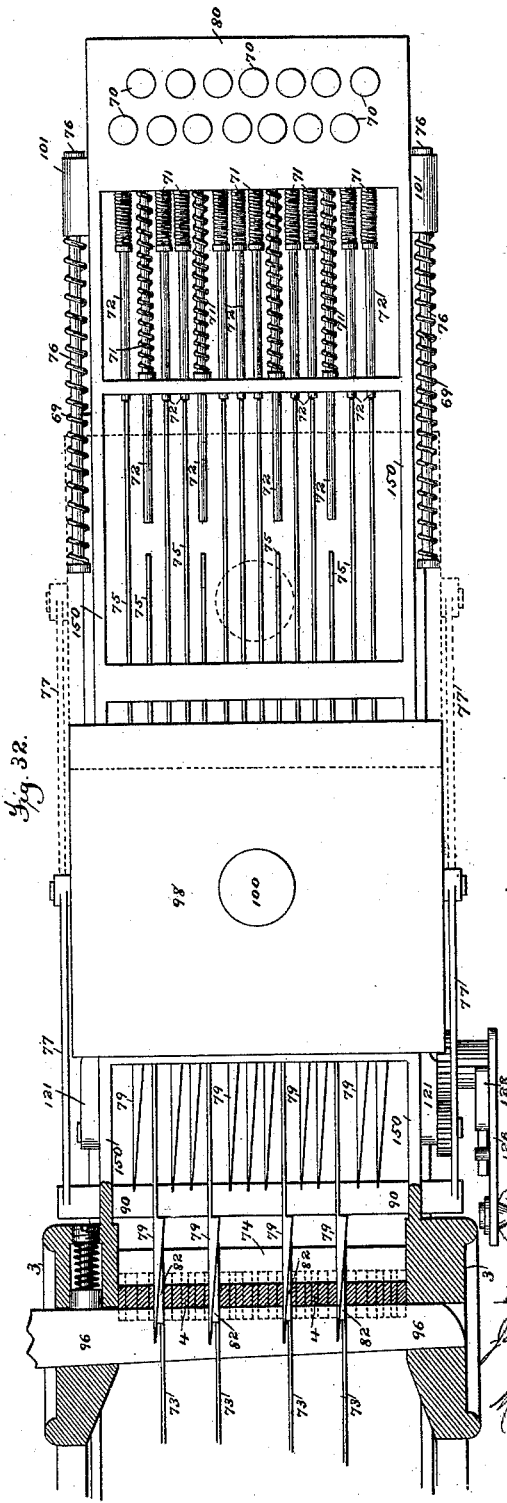

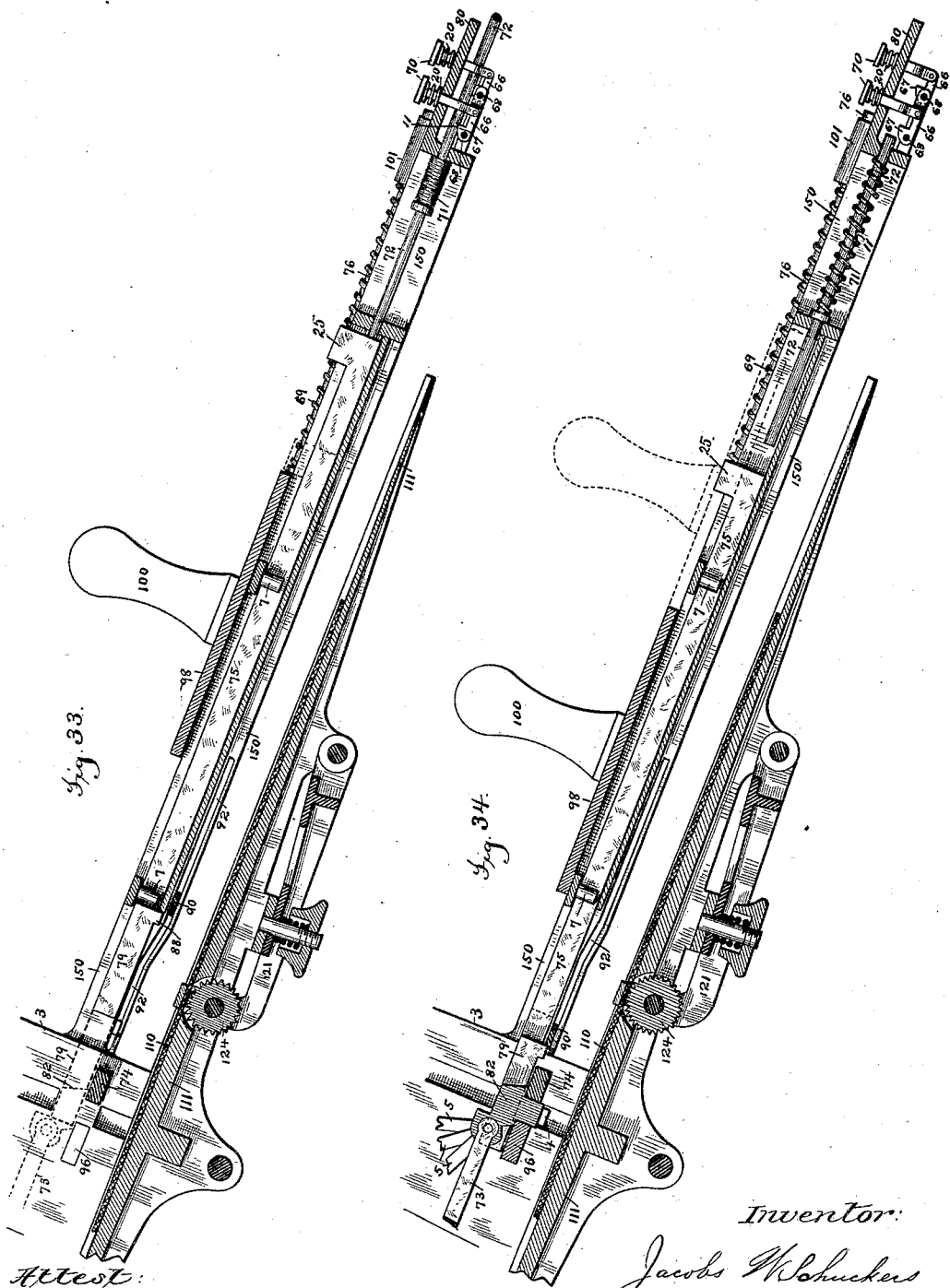

(No Model.)
15 Sheets—Sheet 15.
J. W. SCHUCKERS.
MECHANISM FOR JUSTIFYING COMPOSED LINES OF TYPE.
No. 474,306.
Patented May 3, 1892.
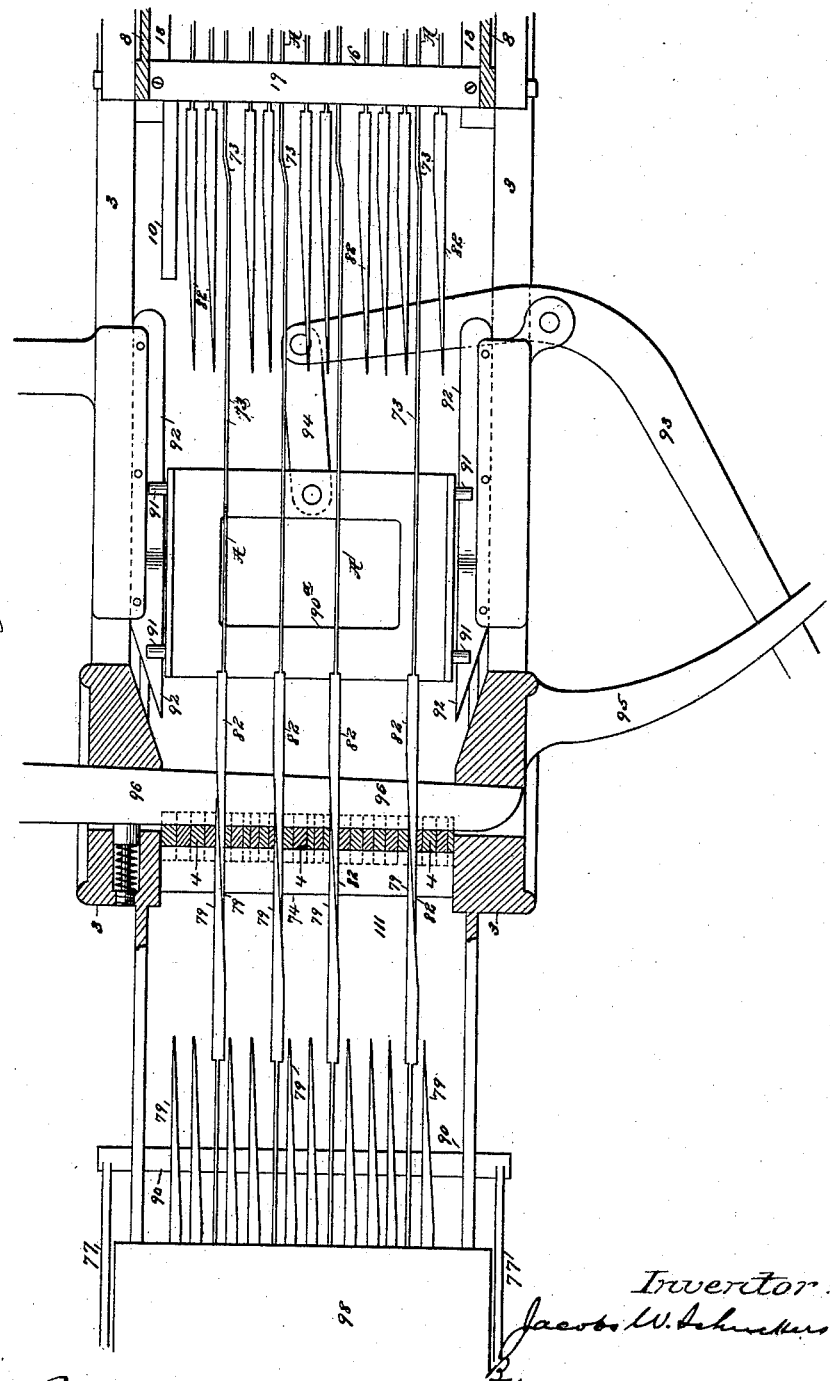

UNITED STATES PATENT OFFICE.

JACOBS W. SCHUCKERS, OF PHILADELPHIA, PENNSYLVANIA, ASSIGNOR TO THE ELECTRIC TYPOGRAPHIC COMPANY, OF NEW YORK, N. Y.

MECHANISM FOR JUSTIFYING COMPOSED LINES OF TYPE.

SPECIFICATION forming part of Letters Patent No. 474,306, dated May 3, 1892.

Original application filed February 27, 1885, Serial No. 157,204. Divided and this application filed November 18, 1886. Serial No. 219,263. (No model.)

*To all whom it may concern:*

Be it known that I, JACOBS W. SCHUCKERS, a citizen of the United States, residing at Philadelphia, county of Philadelphia, and State of Pennsylvania, have invented certain new and useful Improvements in Mechanism for Justifying Composed Lines of Type, fully described and represented in the following specification and the accompanying drawings, forming a part of the same.

My invention relates to a means for justifying the composed lines of type or type-dies in matrix-making or type writing or printing machines in which a line of type or dies is composed and then used either to print a line of matter or as a die from which to take a matrix, or, if female dies are employed, as a matrix from which to cast a printing-bar. A machine of this general class is shown in United States Letters Patent No. 222,642 heretofore granted to me.

In the following description and claims the term "type" will for convenience be used; but this term is to be understood as including female dies as well as relief type.

In composing the lines of type in machines of the class referred to it is necessary, the same as in composing ordinary type, to insert between each two words a space (which for convenience will be hereinafter termed a "primary" space) by which the words are separated a certain distance. Lines of type thus composed will not be of uniform length, and the variations in length, although not great, will be so numerous that it is safe to say that of every thousand lines composed there will not upon an average be two of the proper length. It is of course necessary, in order to have a printed page or column present a good appearance, that the lines should be of the same length, and in order to secure this result it is necessary to justify the lines— that is to say, change the primary spacing between the words—so as to make all the lines of the same length. In changing the spacing between the words to effect the justification it is desirable that the changes should be so made that after the line is justified the spacing between the words will be uniform or substantially uniform, as otherwise the printed line would present a bad appearance. Where ordinary movable type are used the justification is effected by removing some or all of the primary spaces from between the words and inserting thicker or thinner spaces in their stead. This system of justification is not, however, practicable in machines of the class referred to, and even if it were practicable it would be so slow and troublesome as to be very undesirable. It is important, therefore, that machines of the class referred to should be provided with mechanism for automatically effecting the justification of the composed lines, and such mechanism to be of the greatest practical utility must be capacitated to not only accurately and perfectly justify lines of many different lengths, but to do this in such manner as to preserve uniform spacing between the words of each line.

It is the object of my invention to provide a justifying mechanism which is adapted to be used in connection or combined with the type and the mechanism for assembling them in line in machines of the class referred to to effect the results just stated.

As a full understanding of the invention can be best given by describing it in connection with a machine of the class referred to, I have in the accompanying drawings illustrated the justifying mechanism as combined for use with a matrix-making machine of the construction shown and described in my prior application for Letters Patent, filed February 27, 1885, Serial No. 157,204, of which this application is a division. It is to be remarked, however, that the matrix-making mechanism shown in my said prior application is not herein claimed, and also that the justifying mechanism which forms the subject-matter of the present application, although shown in my said prior application, is not therein claimed. In the machine shown in my said prior application and also in the present case the type are carried upon type-bars which are capable of a longitudinal movement and are arranged in such manner that the type which they carry can be assembled in line in the proper order to form a composed line of matter. The type-bars are so arranged that when released they fall by gravity and take their proper positions in the line, and the releasing of the bars in proper sequence is effected by means of suitable connections operated by keys. The primary spacing between the words and also the justification of the lines are effected by means of justifying-bars, which are arranged and operated in the same manner as the type-bars. As the composition progresses one of the justifying-bars is released so as to be inserted between each two words to form the primary space, and after the composition of the line is completed the justifying-bars, which are constructed with special reference to the performance of that function, are advanced so as to increase the spacing between the words until the line is properly justified. After the line is properly justified it is locked in position by devices provided for that purpose and the matrix is then formed, after which the type and justifying bars are distributed or returned to their original positions, and the machine is then ready for the composition of the next line.

Figure 2:
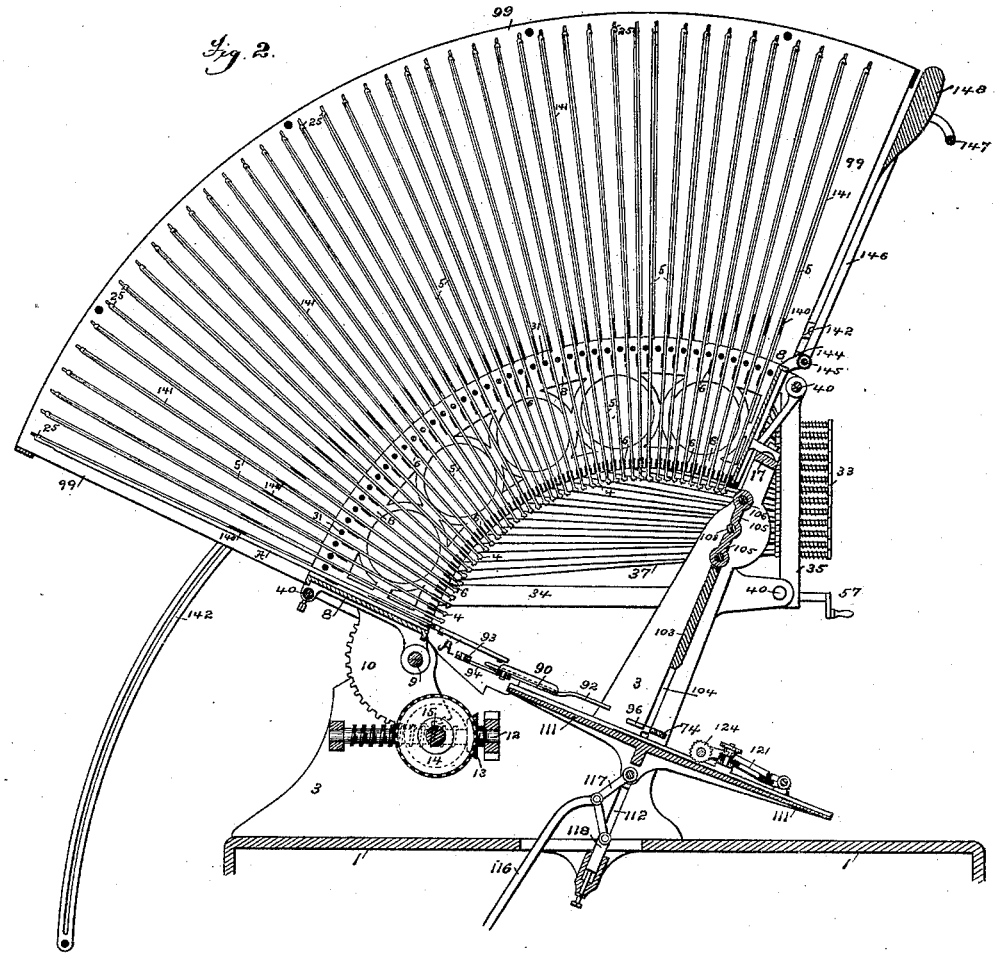
Figure 3:
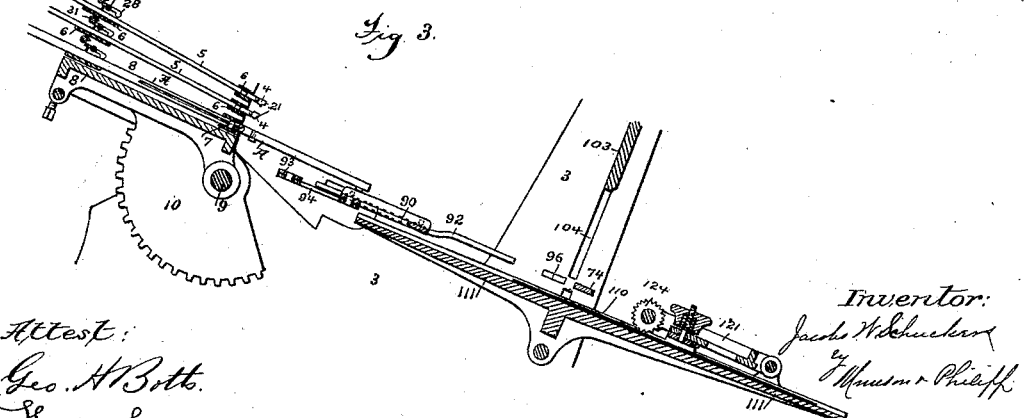
Figure 14:
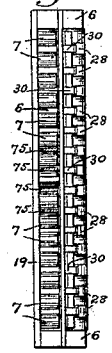
Figure 12:
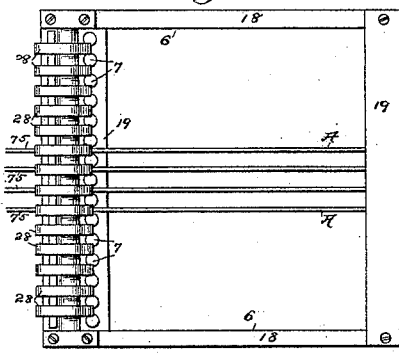
Figure 13:
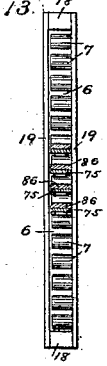
Figure 35:
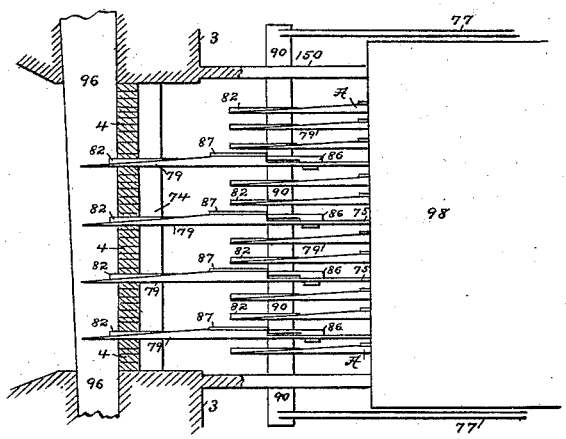
Figure 36:
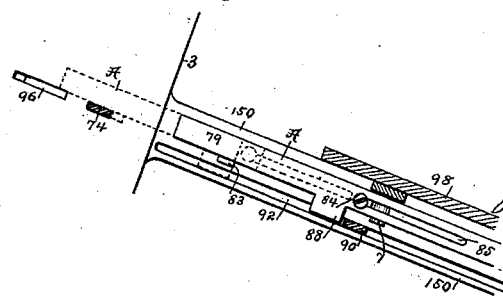
Figure 30:
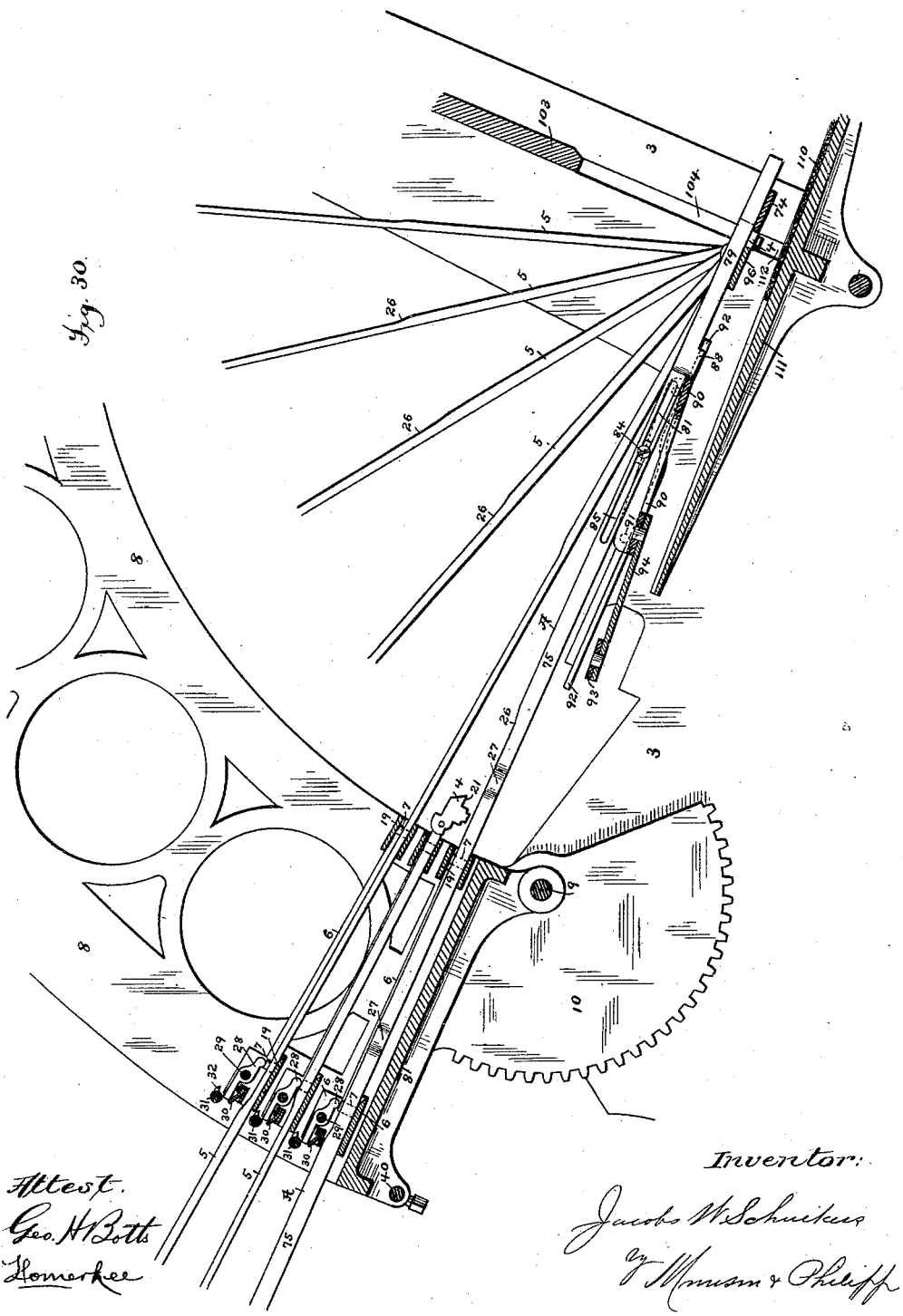

Referring now to the accompanying drawings, Figure 1 is a side elevation of a matrix-making machine of the construction shown in my said prior application, the same being provided with the justifying mechanism embodying the present invention. Fig. 2 is a sectional elevation of the upper part of the machine. It is to be remarked that in these figures many of the smaller details are omitted, as owing to the small scale of the figures such details would lead to confusion. Fig. 3 is a sectional elevation, upon an enlarged scale, showing a part of Fig. 2. Fig. 4 is a front elevation, upon a like scale, of the upper part of the machine, the impression-table, being, however, shown in section. Fig. 5 is an irregular horizontal section, upon a like scale, showing particularly the connections for releasing the justifying-bars. This view is taken near the lines $x$ $x$ of Figs. 1 and 6. Fig. 6 is a side elevation, upon a like scale, of the movable frame carrying the keyboard, looking from the side next to the main part of the machine. Figs. 7, 8, 9, 10, and 11 are views, upon a still more enlarged scale, showing the mechanism for effecting the movement of the keyboard, Fig. 7 being a partial elevation of the keyboard, showing the same partly in section; Fig. 8, a vertical section taken upon the line $x$ $x$ of Fig. 7; Fig. 9, a vertical section taken upon the line $x$ $x$ of Figs. 8 and 10; Fig. 10, a horizontal section taken on the line $y$ $y$ of Fig. 8; and Fig. 11, a detail, which will be hereinafter referred to. Fig. 12 is an enlarged plan view of the frame carrying the justifying-bars, showing the same removed from the machine. Figs. 13 and 14 are opposite end views of the same. Figs. 15 and 16 are respectively a side and edge view, upon an enlarged scale, of one of the justifying-bars, showing the same removed from its frame. Figs. 17 and 18 are opposite side views, upon a still larger scale, of a portion of one of the justifying-bars. Fig. 19 is an edge view, upon a like scale, of the same portion of the bar. Figs. 20 and 21 are longitudinal sections upon the same scale, showing the justifying-wedge in different positions. Figs. 22, 23, and 24 are cross-sections taken upon the lines $x$ $x$, $y$ $y$, and $v$ $v$ of Fig. 18, respectively. Fig. 25 is a perspective view, upon a still larger scale, of the wedge-plate detached from the justifying-bar. Fig. 26 is an enlarged plan view of the justifying mechanism, showing the same in its normal position. Fig. 27 is a sectional elevation of said mechanism, the parts being in the same position. Figs. 28 and 29 are views similar to Fig. 26, showing the parts in different positions to illustrate the operation of the mechanism. Fig. 30 is a view similar to Fig. 27, showing the parts in the same position as in Fig. 29. Figs. 31 and 32 are views similar to Figs. 5 and 29, illustrating a modified organization of the justifying mechanism. Fig. 33 is a sectional elevation upon the same scale as Fig. 32, but showing the parts in the position shown in Fig. 31. Fig. 34 is a similar view showing the parts in the same position as in Fig. 32. Figs. 35 and 36 are views similar to Figs. 32 and 33, illustrating another modified organization of the justifying mechanism. Fig. 37 is a view similar to Fig. 29, showing still another modification.

In order to give a full understanding of the justifying mechanism, to which the present invention particularly relates, it will be necessary to give, in connection with the description of the justifying mechanism, a general description of the particular form of matrix-making mechanism with which the justifying mechanism is shown as combined in the present case. For a detailed description and illustration of this matrix-making mechanism reference is made to my prior application before referred to.

Referring now particularly to Figs. 1 to 11, it will be seen that the working parts of the whole apparatus are supported upon a suitable frame-work, consisting of a horizontal bed-plate 1 and suitable upright portions 2, which frame-work is arranged so as to bring the apparatus at convenient height for the operator. Supported upon the bed-plate 1 is a vertical frame-work composed of two plates 3, which are arranged at such a distance apart as to afford room between them for the plate or block in which the matrix is formed, this plate being of sufficient width to receive the impression of a line of matter of the desired length. Located between the plates 3 is an impression-table 111, which supports the matrix-plate while the impression is being taken. This table is placed at a slight inclination and is arranged to have a limited vertical movement. For this purpose it is provided at its sides with ribs which enter and move freely in guides or ways 112, formed in the plates 3. The vertical movement of the table is effected by means of a toggle-lever 117, one arm of which is connected to the under side of the table and the other arm of which is connected to an adjustable abutment 118, supported in a bearing formed upon the bed-plate 1. The lever 117 is operated through a link 116 from a treadle-lever 115, which is fulcrumed upon the upright portions 2 of the frame-work.

Located just above the impression-table and extending transversely across the machine between the plates 3 is a fixed rest-bar or support 74, against which the type are brought to rest as they are successively brought into line and by which they are in part held and supported during the operation of justification and while the impression is being taken.

The type 4, a sufficient number and variety of which are provided to meet the requirements of ordinary composition, are secured to the end of type-bars 5, formed of slightly-flexible metal. The type-bars are arranged side by side in transverse frames 6, in which they are free to move longitudinally. The frames carrying the type-bars are arranged in a radial position to the rest-bar 74, and are supported in a segmental frame 8, located above and at one side of the rest-bar. The frame 8 is composed of a pair of side plates, connected together by transverse bars or bolts and is of suitable width to permit of the introduction and removal of the frames carrying the type-bars. To facilitate the introduction and removal of these frames the frame 8 is hinged to the plates 3, so as to be swung back to a position to afford ready access to its under side. To effect this the frame 8 is secured at one end to a transverse rock-shaft 9, which is mounted in the plates 3 and carries a segmental gear 10, which engages with a worm on a shaft 12, having a pinion 13, which is engaged by a gear 14 upon a second shaft 15, which is provided with an arm or crank 16, by which it can readily be rotated. By this means the frame 8 may be readily swung upward, so as to afford convenient access to the several frames carrying the type-bars. When the frame 8 is in its normal position, its forward end is supported upon a cross-piece 17, secured to the plates 3.

The frames 6, carrying the type-bars, are, as has been stated, arranged radially to the rest-bar 74, from which it results that when bars in different frames are moved downward and forward the type carried by the several bars approach each other and tend to come into line side by side at the rest-bar. By reason of this arrangement it is possible to assemble in a transverse line at the rest-bar type carried by type-bars in any two or more of the frames. In order, therefore, to compose a line consisting of any combination of letters or characters it is only necessary to have a sufficient number of each of the different letters and characters required distributed in different positions transversely of the machine, so that any letter or character can always be found in some one of the frames at any point transversely of the machine where it is required in composing the line. This result may be secured by providing as many of the frames 6 as there are letters and characters required in ordinary composition, the entire row of bars carried by each frame being provided with the same letter or character. Each of the type is provided upon its forward edge with a projecting shoulder 21, which when the type is brought into position in the line rests upon the rest-bar 74. The type of all the bars carried by any one of the frames 6—that is to say, the type in each transverse row—are arranged at the same angle with respect to their bars; but this angle varies with the type carried by the bars in the different frames and is so adjusted that the faces of the type carried by the bars in all of the frames will, when the type are delivered against the rest-bar 74, be parallel with the top of the table 111. The frames 6, carrying the type-bars, are so arranged that when the bars are released they will move forward and downward, so as to carry the type into their proper positions against the rest-bar 74 by gravity, aided, it may be, by light spring-pressure. The type-bars are held in position in their respective frames in readiness for delivery by frictional contact with series of stop-levers or detents 28, pivoted upon rods 29, located in the upper ends of the frames just above the type-bars and caused to bear upon the type-bars by means of light springs 30. The release of the type-bars to allow the type carried by them to fall into position against the rest-bar as they are required in composing a line of matter is effected by the partial rotation of delivery-shafts 31, one of which is provided for each of the frames 6. Each of the delivery-shafts 31 is provided with a releasing-pin 32, which is so arranged that when the shaft is partially rotated it will impinge against the detent 28 of the type-bar which is to be released, thereby rocking the detent so as to raise it out of contact with the type-bar, and thus release the bar and permit it to move forward and downward and carry its type into proper position against the rest-bar. The delivery-shafts 31 are operated to release the type-bars in the proper sequence by means of a series of operating-keys 33, which are connected with the shafts 31 in a manner which will be hereinafter fully described in connection with the justifying-bars, which are operated in the same manner.

The devices by which the line of type after being composed and justified is locked and aligned previous to taking the impression and the devices by which the matrix-plate is presented in proper position to receive the impression will be hereinafter described. The construction and operation of the justifying mechanism will, however, be more readily understood by giving at this point a brief description of the means by which the type-bars are redistributed or returned to their original positions in their frames after the impression has been taken. The type-bars, as will be observed, are made of such length as to project outward beyond the ends of the frames 6 in which they are carried, and it will also be observed that each of the bars is provided at its outer or upper end with a hook 25. The frame 8, in which the frames 6 are supported, is provided with upwardly-extending side plates 99, which are connected by suitable tie-rods and between which the upper ends of the type-bars extend. These plates 99 are provided with radial slots 141, in which move thin metal lifter-bars 140. The slots 141 are so arranged that each of the bars 140 lies just above or in front of the row of type-bars carried by one of the frames 6 and in such position that when it is moved upward or outward along the slots 141, in which its ends are guided, it will engage with the hook 25 of any one or more of the type-bars which have been released and have moved forward or downward. The ends of the lifter-bars 140 project through the slots 141 and enter slots formed in a pair of curved lifter-bar carriers 142, which are located outside of the plates 99 and move freely up and down and also longitudinally in guides or ways 143, formed at the ends of the plates 99. The carriers 142 are pivotally connected to a pair of arms 144, located upon the outside of the plates 99 and extending from a rock-shaft 145, which is journaled in bearings formed on the forward end of the frame 8. The shaft 145 is provided with arms or levers 146, having a suitable handle 147, by which it can be rocked, so as to raise the carriers 142 and move the bars 140 outward and upward along the slots 141, thereby causing the bars to engage with the hooks 25 of any of the type-bars which have been lowered, and thus carry the type-bars outward and upward and restore them to their normal positions. The type-bars having been restored to their normal positions will be held in that position by the spring-pressed detents 28 until they are again released. When the type-bars have been thus restored to their normal position, the levers 146 will be rocked upward to the position shown, thereby moving the lifter-bars 140 inward and downward in the slots 141, so as to permit the type-bars to move forward and downward when again released. The movement of the levers 146 to restore the type-bars to their normal position may be assisted by means of a suitable counter balancing-weight, as 148, if found necessary or desirable.

The mechanism by which the line of type after being composed is justified preparatory to taking the impression consists, primarily, of a series of justifying-bars A, the construction of which, reference being had particularly to Figs. 15 to 25, will now be described. Each of these bars consists of two principal parts—viz., a spreading-bar 75 and a wedge-plate 82. The spreading-bars, which form the means for guiding and manipulating the justifying-wedges, are simply extensions of the wedges and are composed of thin pieces of metal and are of the same or substantially the same length as the type-bars and are provided at their rear ends with hooks 25, the same as the type-bars. Each of the spreading-bars is thickened at its forward end, and this thickened portion is tapered by being inclined upon one side or face, so as to form what I term the "justifying-wedge" 79 upon the end of the spreading-bar. These wedges are so tapered that as they are advanced they act to constantly increase the spaces during each part of their movement and are radically different from the blank dies shown upon the justifying-arms in my prior Letters Patent before referred to, which blank dies have parallel faces connected by abrupt or comparatively abrupt shoulders formed upon the justifying-arms. The inclined face of the wedge 79 is provided with a longitudinal channel 78, in which rests a tongue-piece 81, to the forward end of which is secured a wedge-plate 82, which is inclined upon one side, but in the reverse direction to the wedge 79, and is arranged to rest against the inclined face of the wedge 79 with the inclined faces of the two in contact. From this construction it will be seen that whenever the spreading-bar 75 and the wedge-plate 82 are moved one with relation to the other, so as to cause the plate 82 to take different positions along the inclined face of the wedge 79, the combined thickness of the two will be varied, the thickness being increased as the thicker portions of the wedge are brought to bear against the wedge-plate, and vice versa; but it will also be seen that by reason of each of the parts being inclined on one side only and the inclined sides being in contact the outsides of the wedge 79 and plate 82 will be parallel in whatever position the wedge and plate take with relation to each other. The tongue-piece 81 is held and guided in its position in the channel 78 by a cap-plate 87, which is secured to the rear end of the wedge 79. The rear end of the tongue-piece 81 is provided with a head 86, having a pin 84, which moves in a slot 85 in the spreading-bar, and thus limits the movement of the tongue-piece in either direction. The wedge-plate 82 is provided upon its under side with an arresting and locking projection 83, which when the justifying-bar is released abuts against the rest-bar 74, as will be more fully explained when the operation of the justifying mechanism is described, and the wedge 79 is provided inside the cap-plate 87 with a light spring-detent 89, which engages with a nick in the tongue-piece 81, so as to hold the tongue-piece and the plate 82 in their forward position until pressure is applied to the spreading-bar, as will be hereinafter explained. It is to be remarked, however, that the detent 89 may in many cases be omitted, the friction of the parts being depended upon to perform the same function. The spreading-bars 75 are also provided upon their lower edges, and preferably just at the rear ends of the wedges 79, with shoulders 88, the purpose of which will appear when the operation of the justifying-bars is explained.

The justifying-bars are arranged side by side in a transverse row in a frame 6, which is supported in the segmental frame 8 in the same manner as the frames carrying the type-bars. The frame 6, carrying the justifying-bars, is of rectangular form, (see Figs. 12, 13, and 14,) and consists of two side pieces 18, connected at their ends by plates 19, between which the justifying-bars pass, so as to move freely. The justifying-bars are guided in the frames by means of pins 7, which are arranged between the plates 19 and a sufficient distance apart to receive one of the bars between each two of the pins. The frame 6 is provided at its upper end with a rod 29, upon which is pivoted a series of detents 28, corresponding in number to the bars and arranged to bear upon the upper edges of the bars. The detents 28 are provided with springs 30, (see Figs. 27 and 30,) by which they are held upon the bars with sufficient pressure to retain the bars in their normal position in the frame until they are released by the partial rotation of the delivery-shaft 31. The frame 6, carrying the justifying-bars, is constructed the same as the frame carrying the type-bars, and therefore the description just given applies equally to the frames carrying the type-bars.

The frame 6, carrying the justifying-bars, is so arranged, the same as the frames carrying the type-bars, that when the justifying-bars are released they will be moved forward and downward to take their proper places by gravity in the line being composed, though in this case, the same as in the case of the type-bars, the movement of the bars may be aided or accelerated by means of light springs provided for that purpose.

The portions of the justifying-bars which are provided with the hooks 25 extend rearward through the frame 6, the same as the type-bars, and are located in such position with relation to one of the lifter-bars 140 that said lifter-bar will engage with the hooks and restore the justifying-bars to their normal position at the same time that the type-bars are restored to their normal position, as already explained.

In order to increase the number of the type-bars which may be operated within a given space and thus avoid making the machine unduly large, the bars in each of the frames 6 are so arranged that they alternate with those in the adjoining frame or frames. This arrangement of the bars causes the type carried by the bars in each two adjoining frames to slightly overlap each other, and also causes some of the type to slightly overlap the justifying-wedges 79 and wedge-plates 82 of the justifying-bars. As a consequence of this it might happen when the type and justifying bars were released that the type and the wedges 79 and wedge-plates 82, instead of passing into line side by side, would strike against each other and thus be prevented from taking their proper positions in the line. To avoid this the justifying-bars and also the type-bars are bent or deflected laterally, so as to form inclined shoulders 27, (see Fig. 16,) which as the bars are released and pass forward and downward engage with the pins 7, so as to deflect the ends of the bars, first, to the right, as respects the operator, or away from the last type brought into the line being composed, as indicated by the full lines in Fig. 28, and then back to the left toward the end of the line, as shown by the full dotted lines in said figure. By this means as each of the type and justifying bars is delivered its type or justifying wedge and wedge-plate, as the case may be, is caused to move laterally away from the last type or justifying-wedge and wedge-plate, as the case may be, so as to pass by it and into the line, and then move laterally up to the side of the last type or wedge and wedge-plate, so as to be out of the way of the next type or wedge and wedge-plate delivered. This is a feature of considerable importance in the practical operation of the machine, as it permits the whole machine to be much more compact than it otherwise could be.

The releasing of the justifying-bars when required for use is effected by means of one of the keys 33, which is provided with connections for that purpose exactly like the connections with which the other keys are provided for releasing the type-bars. The following description, therefore, of the mechanism for releasing the justifying-bars applies also to the mechanism for releasing the type-bars.

The releasing of all the justifying-bars is, in the organization shown, accomplished by a single key, and the releasing of all the type-bars in any one of the frames is also accomplished by a single key. It is to be understood, therefore, that the number of keys corresponds to the number of frames carrying the type and justifying bars. The keys for the type-bars may be each marked with the letter or character upon the type carried by the bars which that key releases, and the key for releasing the justifying-bars may be marked with the word "Space" or any other character to indicate its purpose. These keys are arranged in a traveling keyboard 35, (see Figs. 4 to 11,) which, as shown in the present case, is arranged in vertical position at the side of the frame 8, and is arranged to move automatically as the composition progresses in a line parallel with the line of matter being composed. The keyboard 35 is secured to a pair of sector-shaped side plates 34, which are suitably connected, and together with the keyboard form a frame which supports the connections for releasing the type and justifying bars. Each of the keys is connected to a sliding bar 36, which passes through openings in the keyboard and an inner plate 24, and is connected to a rod 37, the opposite end of which is pivoted to an arm 38 upon the delivery-shaft 31 which that key is to operate.

The delivery-shafts 31 thus connected to the several keys are journaled in bearings in the plates 34, and projecting through the inner one of the plates pass through openings in the side plates of the frame 8 and extend across said frame in position just above the rear ends of the detents 28 of the several frames 6.

The connections just described are so arranged, as will be observed, that whenever any one of the keys is moved inward the delivery-shaft connected thereto will be given a partial rotation. Each of the delivery-shafts is provided with a releasing-pin 32, which projects from the shaft in such position as to overlie the rear end of one of the detents 28, so that whenever the shaft is partially rotated or rocked by the movement of the key, as just described, the pin 32 will come into contact with and rock the detent 28, which is beneath it, so as to raise the detent off the type or justifying bar, as the case may be, and thus release the bar and allow it to move forward and downward in its frame. The justifying-bars and also the type-bars are, as will be observed, provided upon their upper edges with longitudinal recesses or depressions 26 (see Fig. 15) of considerable length. These depressions are, as will be observed, so arranged that as soon as a bar has moved forward and downward a short distance in its frame the depression will be brought under the detent 28, and the detent can then be released by the pin 32 without arresting the bar. This feature permits the keys to be operated in much more rapid succession, as it makes it unnecessary to keep the detent raised until the bar has completed its forward and downward movement, but permits the detent to be released as soon as the bar has commenced to move.

The openings for the delivery-shafts 31 in the frame 8 are sufficiently large to permit the shafts to move freely longitudinally therein, and the shafts are of sufficient length to permit the releasing-pins 32 to be moved into position over any one of the detents 28.

To enable the entire series of delivery-shafts to be simultaneously inserted and removed from the frame 8, the openings for the shafts in the side of the frame next to the keyboard are provided with recesses of proper dimensions to permit of the passage of the releasing-pins 32 when the delivery-shafts are inserted and withdrawn.

By arranging the keyboard and its connections for releasing the type and justifying bars so that they are moved as the composition progresses it becomes possible to bring the releasing-pins 32 of the delivery-shafts into position to operate any one of the detents 28, and it therefore becomes necessary to provide but one delivery-shaft and one releasing-pin for each one of the frames carrying the type and justifying bars, thus permitting all of the bars in any one frame to be released successively by a single key.

In order that the keyboard may receive the proper movement as the composition progresses to bring the delivery-shafts 31 and their releasing-pins 32 to the proper position to release the type and justifying bars as they are required for use, the keyboard and the plates 34 are supported upon three stationary shafts 40, which extend laterally from the frame 8 and pass through openings formed in the plates 34. Each of the shafts 40 is provided with a rack 41, which engages with a pinion to which a partial rotation is imparted, so as to give the keyboard the proper amount of movement as each key is depressed to release one of the type or justifying bars. To effect this the bars 36 pass through slots 42 in a plate 43, which is arranged to move vertically inside the keyboard. Each of the bars 36 is provided upon its upper edge with an incline 44, which is so located that as the bar is moved inward by the depression of the key to which it is connected the incline will act upon the end of the slot 42 through which the bar passes and move the plate 43 upward. The plate 43 is connected at its lower end to a pawl-lever 45, which is pivoted on a plate 46, which in turn is pivoted on a shaft 47. The pawl 48 of the lever 45 engages with a ratchet 49, fixed upon the shaft 47. The shaft 47 is provided with pinions 55 56, which engage with the racks upon two of the shafts 40 and with a bevel-pinion 51, which engages with a bevel-pinion 52 on a shaft 53, upon the opposite end of which is a pinion 54, which engages with the rack 41 upon the other of the shafts 40. From this arrangement it results that whenever any one of the keys 33 is depressed to operate the delivery-shaft 21, with which it is connected to release one of the type or justifying bars the incline 44 upon the bar 36 of that key will raise the plate 43, thereby rocking the lever 45 and causing the pawl 48 to engage with the ratchet 49. As soon as the pawl 48 engages with the ratchet 49 the continued upward movement of the plate 43 will rock the plate 46 and give a partial rotation to the shaft 47, and thus through the connections described move the keyboard along the shafts 40. The inclines 44 are of such length and pitch that the movement imparted by them to the plate 43 will be sufficient to rock the lever 45 to bring the pawl 48 into engagement with the ratchet 49 and then rock the plate 46 sufficiently to impart the proper movement to the shaft 47 to move the keyboard sufficiently to shift each of the releasing-pins 32 from a position over one of the detents 28 to a position over the next adjoining one. The inclines 44 are located in such position on the bars 36 and the keys 33 are so arranged that the bars 36 can be moved inward a short distance after the inclines 44 have passed through the slots 42, thereby permitting the delivery-shafts 31 to be rocked a certain distance after the keyboard has completed its movement. The releasing-pins 32 are so positioned on the shafts 31 that the rocking movement given to the shafts during the time when the inclines 44 are acting on the plate 43 to shift the keyboard will not be sufficient to bring the pins into engagement with the detents 28, but that the further rocking movement given to the shafts by the continued inward movement of the bars 36 after the inclines 44 have passed through the slots 42 will bring the pins 32 into engagement with the detents. From this arrangement of the parts it results that the first part of the inward movement of a key operates simply to shift the keyboard and the delivery-shafts so as to bring the pin 32 of the shaft to which the key is connected into position over the proper detent, and this having been accomplished the continued inward movement of the key operates to release the desired type or justifying bar. As soon as pressure is removed from the key it will be immediately returned to its original position by means of a spring 58, with which each of the keys is provided, thus allowing the plate 43 to fall back to its original position by gravity, in doing which it will rock the lever 45 downward so as to disengage the pawl 48 from the ratchet 49, and thus rock the plate 46 back to its original position. This operation will be repeated as each key is depressed, thus allowing a single key to operate the detents controlling an entire row of the type or justifying bars.

The movement of the lever 45 to engage the pawl 48 with and disengage it from the ratchet 49 may be limited by means of studs 50, projecting from the plate 46, and the lower one of these studs will serve as a means of returning the plate 46 to its normal position after it has been rocked upward by the upward movement of the plate 43. The downward movement of the plate 46 is limited by a shoulder 22, formed on the side of an opening 65 in the side plate 34, into which opening the end of the plate 46 extends.

It will sometimes be desirable to move the keyboard in the reverse direction a distance just equal to the distance between one or more of the detents 28. For this purpose the shaft 47 is provided with a second ratchet 62, similar to the ratchet 49, but having its teeth set in the reverse direction, and with a second plate 60, arranged similar to the plate 46. The plate 60 carries a pawl-lever 59, which is pivoted to the plate and is provided with a pawl 61, which is arranged to engage with the ratchet 62. The lever 59 extends outward at the side of the keyboard and terminates in a head or key by which it can readily be depressed. The plate 60 is provided with a light spring 63, which operates to normally hold the lever 59 in such position that the pawl 61 will be out of engagement with the ratchet 62, and the movement of the lever 59 to engage the pawl 61 with and disengage it from the ratchet 62 is limited by means of studs 39, projecting from the plate 60. The movement of the plate 60 is limited by means of a shoulder 23, formed on the side of the opening 65, into which the end of the plate 60 also projects. The plate 60 is normally held in its raised position by means of a suitable spring 64. It will be observed that when the plate 43 is in its normal position—that is to say, when no one of the keys is moved inward—the pawl 48 is out of engagement with the ratchet 49, so that when the keys are in this position the shaft 47 is free to be turned in either direction. When, therefore, it is desired for any reason to move the keyboard one or more steps in the reverse direction, it is only necessary to depress the lever 59. When this is done, the lever will first move against the tension of the spring 63, (which spring is lighter than the spring 64,) so as to rock the pawl 61 into engagement with the ratchet 62 and cause the lever to come into contact with the lower one of the studs 39. The continued movement of the lever 59 will then rock the plate 60 against the tension of the spring 64, so as to impart a partial reverse rotation to the shaft 47, and thus through the connections described move the keyboard in the reverse direction. Upon releasing the lever 59 the springs 63 64 will at once restore the lever and the plate 60 to their original positions.

To enable the keyboard to be returned to its original position after the completion of a line, as well as to provide for its rapid movement in either direction, the shaft 47 is provided with a crank 57, by which it can be rotated in either direction independently of the keys or the lever 59.

The frame 6, carrying the justifying-bars, is so arranged in the supporting-frame 8 that when any one of the justifying-bars is released and allowed to move forward and downward its forward end will pass just above the rest-bar 74, so that the projection 83 will come into contact with the rest-bar and arrest the justifying-bar. This will bring the wedge-plate 82 and the point of the wedge 79 into position to form the primary space between any two words.

Located just below the justifying-bars and between the frame 8 and the rest-bar 74 is a thrust plate or bar 90, which extends transversely between the side plates 3 and is provided with bearings 91, which are arranged to slide on guides or ways 92, secured to the the plates 3. The guides 92 are curved upward as they approach the rest-bar 74, so that as the thrust-plate is moved toward the rest-bar it is raised and brought into position to engage the shoulders 88 on the spreading-bars of any of the justifying-bars which may have been released and advanced into position in the line. By this means and by continuing to advance the thrust-plate after it has engaged with the shoulders 88 the spreading-bars may be advanced so as to cause the wedges 79 to move forward along the inclined faces of the wedge-plates 82, the wedge-plates being held stationary by the projections 83, which abut against the rest-bar so as to bring thicker portions of the wedges 79 between the type, and thus increase the primary spacing between the words. It is by this means that the justification of the composed line is effected, as will be more fully hereinafter explained when the operation of the machine is described.

The movement of the thrust-plate 90 is effected by means of a lever 93, which is fulcrumed on one of the side plates 3, and is connected to the rear side of the thrust-plate by means of an arm or link 94. The lever 93 is guided in a slot formed in an arm 95, extending from the side plate 3, and its return movement to retract the thrust-plate may be effected, if desired, by a spring suitably arranged for that purpose.

The operation of the mechanism thus far described is as follows: The keys 33, corresponding to the various letters and characters, will be pressed inward in the order required to release the type-bars carrying the corresponding letters and characters. As each key is pressed inward the keyboard, and with it the delivery-shafts 31, will be shifted by the mechanism hereinbefore described, so as to bring the releasing-pin 32 of the delivery-shaft, which is operated into such position that as the key is pressed inward still further it will act on the proper detent and release the required type-bar. At each point in the line where a space is required to be inserted between two type the key which operates the delivery-shaft 31 for releasing the justifying-bars will be operated, thereby releasing one of the justifying-bars and allowing it to move forward and downward until it is arrested by the projection 83 coming into contact with the rest-bar 74. The justifying-bar which is released will by this means be arrested in such position that the wedge-plate 82 and the point of its justifying-wedge 79 will be inserted between two adjoining type, (see Fig. 28,) and will thus form the primary space corresponding to the primary space always inserted at a corresponding point in the line by the compositor in ordinary type composition. It will be observed (see Fig. 27) that the thrust-plate 90 is so arranged that when in its retracted position the projections 83 and the shoulders 88 of the justifying-bars can pass forward above it, and also that the parts are so arranged that when the justifying-bars are advanced (see Fig. 30) so as to bring their projections 83 against the rest-bar the shoulders 88 will be carried to a position in advance of the thrust-plate. The projections 83, as has been explained, are upon the wedge-plates 82, which plates are not connected rigidly to the spreading-bars, but to the tongue-pieces 81, which slide freely in the channels 78 in the sides of said spreading-bars. This being the case, it might sometimes happen that the momentum acquired by the justifying-bars in moving forward and downward after they were released would be sufficient to overcome the friction between the spreading-bars and the wedge-plates 82 and their tongue-pieces 81, and thus cause the spreading-bars when the plates 82 were arrested to move forward slightly, thus causing the justifying-wedges 79 to move along the wedge-plates before they were brought to rest. This, if it should occur, would bring thicker portions of the wedges 79 to bear against the plates 82, and would thus increase the primary spacing beyond what is desirable or necessary, and would also tend to make the spacing irregular. This, however, is prevented by the spring-detents 89, which enter the recesses in the tongue-pieces 81, and thus lock the plates 82 and the tongue-pieces 81 to the spreading-bars with sufficient firmness to prevent them from moving with relation to each other until considerable force is applied. The key 33 having been operated until a complete line of type has been assembled along the rest-bar 74 with one of the justifying-bars inserted at each point where a space is required, as just stated, it will be found that in nearly every case the line thus composed will not be of exactly the proper length. In order, therefore, to make the line of the proper length, it is necessary to jusitify it by increasing the spacing between the words, and, as before explained, it is important that in increasing the primary spacing to effect the justification the increase in spacing should be uniformly distributed throughout the line—that is to say, it is important that each space in the line should be increased to the same or substantially the same extent This increase in the spacing to effect the justification is accomplished by means of the justifying-wedges 79, carried by the spreading-bars. To do this the lever 93 is operated so as to raise and advance the thrust-plate 90 against the shoulders 88 of the spreading-bars of those justifying-bars which have been released and advanced. As soon as pressure is thus applied to the spreading-bars the bars will be advanced so as to move the wedges 79 along the wedge-plates 82, as shown in Figs. 29 and 30. As the wedges are thus advanced the inclined sides of the wedges, acting upon the inclined sides of the wedge-plates 82, will force the outside faces of the two apart, thereby increasing the primary spacing of the line to effect the justification. It will be observed that in this operation the outer faces of the wedges 79 and wedge-plates 82 remain parallel to each other, so that there is no tendency to twist or distort the type in the line. It will also be observed that the thrust-plate 90 acts upon the spreading-bars of all the justifying-bars alike, thereby moving all of the wedges 79 exactly the same distance, so that each primary space is increased to the same extent, thereby leaving the spacing uniform after the justification. By this means the justification of the composed line is effected automatically and in a perfect manner and at a single operation, which requires but very little time. The line having been composed and justified, it is properly aligned by means of an aligning-wedge 96, which is passed through openings in the side plates 3 just in the rear of the line of type, and is slightly tapered so as to force and hold all of the type against the rest-bar 74. The wedge 96 is operated by means of a lever 97, (see Fig. 5,) which is fulcrumed in a bearing on one of the side plates 3 and is pivotally connected to the wedge. After the line has been thus aligned it is locked in position for the impression by means of an abutment-block 103, (see Figs. 2 and 4,) which is arranged to move vertically in bearings 104, formed in the plates 3, and is moved downward on top of the line of type and held in that position by means of a crank 109, the shaft 108 of which is provided with arms 107, which are pivotally connected to a short shaft 106, which is connected by a link 105 with the abutment-block. The matrix plate or block 110 in which the impression of the line of type is taken, and which may be of paper, wood, or other material, is supported upon the impression-table 111, so as to be advanced beneath the assembled line of type, and this matrix-plate being in position upon the table and the line of type having been assembled, justified, aligned, and locked, as has been described, the impression is taken by operating the treadle 115, so as to raise the impression-table and carry the matrix-plate upward against the type, so as to indent the impression of the line into the matrix-plate. This having been done, the treadle is released and the table lowered. The abutment-block 103 is then raised away from the type, the aligning-wedge withdrawn, and the arms 146 are operated so as to raise the carriers 142 and move the lifter-bars 140 upward and outward in their slots 141. As these bars move upward and outward in their slots they will engage with the hooks 25 of the several type and justifying bars which have been assembled in the line, thereby moving them back to their normal positions in their frames 6. As the type and justifying bars are restored to their normal positions, the full portions of the bars at the ends of the recesses 26 will be carried under the detents 28, so that the bars will be caught and held by the detents. As the justifying-bars are carried outward and upward to their normal positions, the heads 86 of the tongue-pieces 81 will abut against the pins 7 in the lower end of the frame carrying the justifying-bars and will be arrested thereby, after which the spreading-bars will be carried backward by the lifter-bar 140, thereby restoring the plates 82 and the tongue-pieces 81 to their original positions. Succeeding lines will then be composed and justified and the impressions taken in the manner already described. The movement of the matrix-plate to give the proper spacing between the lines is effected by means of a pair of feeding-wheels 124, (see Figs. 1, 2, and 5,) which are arranged to bear upon the edges of the matrix-plate as it lies upon the impression-table. These wheels are arranged upon an axle, which is supported in a frame 121, mounted upon the impression-table, and are operated through suitable connections by a pawl-lever 128, which is connected to one end of a rod or link 126 rising from the bed-plate 1. The feeding mechanism thus organized operates as the impression-table is lowered after the impression of each line is taken to advance the matrix-plate the proper distance to receive the impression of the next line. For a more full and complete description of the construction and operation of this feeding mechanism reference is made to my prior application hereinbefore referred to.

I have thus shown and described my improved justifying mechanism as combined with a particular form of matrix-making mechanism for the purpose, as before stated, of making its construction and mode of operation more readily and easily understood; but it is not to be understood that the justifying mechanism constituting the invention is limited in its application to a machine of the particular construction shown. It will readily be seen by those familiar with this art that this justifying mechanism may be very slight and in some cases without any modification be combined with the type and the mechanism for assembling them in line in any matrix-making or type-writing or printing machine in which a line of type or dies is composed or assembled and then used to print a line of matter, or as a die from which to take a matrix, or as a matrix from which to cast a printing-bar; and the invention therefore includes the combination of the herein-described justifying mechanism with the type and the mechanism for assembling them in line in any of the machines of the class referred to.

The form and arrangement of the connections for releasing or operating the justifying-bars which have been described may be varied within wide limits or wholly departed from without departing from the broad features of the invention. In fact, the invention, broadly speaking, is not limited to any particular form or arrangement of connections for releasing or operating the justifying-bars. In some cases it may be found preferable to provide separate and independent connections for operating or releasing each bar, and in some cases it may be found preferable to operate or release the bars by a treadle or treadles, and connections suitable for accomplishing this can be readily provided by any skillful mechanic. Although it is preferable that the justifying-bars should be so arranged that when released they will move into proper position by their own gravity, it is not essential that they should be so arranged. They may be moved positively or by the action of springs or weights. It is also preferable that the wedge-plates 82 should be carried by the spreading-bars; but this also is not essential, as they may be arranged to be operated independently of the spreading-bars without departing from the broad features of the invention. In Figs. 31 to 34 an organization of this character is illustrated. In this organization the wedge-plates 82 are carried by a series of bars 73, which are of the same or substantially the same form as the type-bars, and are operated in the same manner. The wedge-plates are of the same or substantially the same form as already described, except that they are inclined or tapered in the opposite direction. The spreading-bars 75 are of substantially the same form as already described, except that in this case they are not provided with the recesses 26 and inclined shoulders 27, and the channels 78 are also omitted from the justifying-wedges 79. The spreading-bars are arranged in a transverse row and are supported and guided in a frame 150, which extends forward from the side plates 3 above the impression-table and is constructed much the same as the frames 6, before described. The bars are arranged to be moved freely inward and outward between guide-pins 7, which lie between them, and the frame supporting the bars is so positioned that as the bars are moved inward the ends of the justifying-wedges 79 will pass just above the rest-bar 74. The frame 150, as will be observed, inclines downward from the rest-bar 74, so that the tendency of the spreading-bars is to move away from the rest-bar, and as a consequence they are retained in their retracted or normal position by gravity. The frame 150 is provided at its outer end with bearings for a series of rods 72, equal in number to the spreading-bars, which are arranged to move freely in and out and in such position as to abut against the ends of the spreading-bars. The rods 72 are provided with springs 71, the tendency of which is to move the rods inward, as shown in Figs. 32 and 34. Located at the outer end of the frame 150 is a keyboard 80, having a series of keys 70, equal in number to the number of spreading-bars and rods 72. The stems of the keys 70 pass through the keyboard and are connected to the arms 66 of a series of catches or detents 67, which are pivoted upon transverse rods 68 and located directly under the rods 72 and in position to engage with notches 11, formed in the under sides of said rods, when they are rocked into proper position to do so. The stems of the keys 70 are provided with springs 20, the tendency of which is to rock the detents 67 into position to engage with the notches 11 of the rods 72. The thrust-bar 90 extends across the frame 150 beneath the spreading-bars, and extends through guides or ways 92, formed in the sides of the frame. The guides 92 are of such form that as the thrust-bar is moved inward it will be raised so as to abut against the shoulders 88 of any of the spreading-bars which have been moved inward. The ends of the thrust-bar extend through the guides 92 and are connected by links 77 with the sides of an arresting or abutting plate 98, which rests upon and is arranged to be moved freely along the frame 150. The plate 98 is provided with a suitable handle 100, by which it can be moved along the frame, and is held and guided on the frame by means of flanges on its sides which fit over the sides of the frame. The frame 150 is provided at its outer end and upon opposite sides with a pair of rods 76, which move freely in and out of bearings 101, formed on the frame, and are provided with springs 69, the tendency of which is to move and hold the rods inward in the position shown in Figs. 31 and 32. The purpose of these rods will appear when the operation of the justifying mechanism is explained.

The operation of the mechanism when thus organized is as follows: Before commencing to compose a line all of the type-bars and the bars 73, carrying the wedge-plates 82, will be retracted by means of the lifter-bars 140, as already described. The abutment-plate 98 will also be moved outward to the position shown by dotted lines in Figs. 32 and 34. As the plate 98 is thus moved outward it will engage with the hooks 25 of any of the spreading-bars which may have been advanced and move all of the bars outward. As the bars are moved outward they will abut against the ends of the rods 72 and move the rods outward, thereby compressing the springs 71. As the rods 72 are moved outward they will engage with the inclined faces of the detents 67 and depress the latter against the tension of the springs 20, and as the spreading-bars and rods 72 reach the limit of their outward movement the notches 11 will be brought over the detents, and the springs 20 will then rock the detents upward and cause them to engage with the notches, so as to hold the rods in their retracted position, as shown in Figs. 31 and 33. The spreading-bars will then also remain in their retracted position. During this operation the thrust-bar 90 will move outward idly in the ways 92, and the rods 76 will also be moved outward against the tension of the springs 69. After the rods 72 have been caught by the detents 67 the plate 98 will be released, when it and the thrust-bar will be at once moved forward by the springs 69 to the position shown in Figs. 31 and 33. The parts will then be in readiness for the composition to proceed. The type-bars will be released in the proper order by the mechanism hereinbefore described and will take their proper positions along the rest-bar 74. At each point where a space is required one of the bars 73, carrying a wedge-plate 82, will be released, so as to allow the wedge-plate to take its position by the side of the last type, where it will be arrested by its projection 83, which will abut against the rest-bar. The mechanism for releasing the bars 73 is the same as already described. After each of the wedge-plates 82 has taken its position by the side of the last type one of the keys 70 will be depressed, so as to rock the detent 67, with which it is connected, out of the notch 11, and thus release the rod 72. As soon as this is done the spring 71 upon that rod will expand and move the rod inward, and the rod, abutting against the spreading-bar, with which it is in line, will move the bar inward until the end of its justifying-wedge 79 has passed above the rest-bar 74 and into position by the side of the wedge-plate 82, as shown by dotted lines in Figs. 31 and 33. As the spreading-bar arrives in this position its hook 25 will abut against the plate 98 and the bar will be arrested. When the wedge-plates 82 and the wedges 79 are in this position, they form the primary spaces between the words, the same as has already been described. After the composition of the line has been completed and the aligning-wedge inserted, as has already been described, the justification is effected by advancing the plate 98, as shown in Figs. 32 and 34. As the plate 98 is advanced the thrust-bar 90 will move inward and upward in its way 92, so as to engage with the shoulders 88 of any of the spreading-bars which have been moved inward, and as the inward movement of the plate 98 is continued the thrust-plate will move the spreading-bars with which it has engaged still farther inward, so as to advance the wedges 79 along the wedge-plates and increase the primary spaces, thus justifying the line, as shown in Figs. 32 and 34. After the impression has been taken the parts will be restored to their normal positions in the manner already described.

The spreading-bars, instead of being located in the position shown, may of course be located on the same side of the rest-bar as the bars carrying the wedge-plates, and in such case the wedge-plates will of course be tapered in the opposite direction. The particular form and arrangement of devices shown for operating the spreading-bars are not essential. The bars may be operated by any approved form of devices without departing from the essential features of the invention.

The justifying-bars, when constructed in the manner first described—that is, when constructed so that the wedge-plates are carried by the spreading-bars—may, if preferred, be located in the position and operated in the manner shown in Figs. 31 to 34. An organization of this character is illustrated in Figs. 35 and 36. In this case the projections 83 of the wedge-plates abut against the front side of the rest-bar 74, as shown by dotted lines in Fig. 36, when the justifying-bars are moved inward to form the primary spaces, and the rest-bar, acting against these projections, serves to hold the wedge-plates when the spreading-bars are advanced to effect the justification, as shown in Fig. 35. The operation of the mechanism when thus organized is the same as described in connection with Figs. 31 to 34, except that to effect the primary spacing between the words it will only be necessary to operate the keys 70.

It will be observed that, as thus far described, the justifying mechanism consists, primarily, of the justifying-wedges 79 and the wedge-plates 82, these two parts serving to form the primary spaces between the words and also operating, when moved one with relation to the other, to increase the primary spacing so as to effect the justification of the line. As herein illustrated, this increasing of the spacing is effected by advancing the spreading-bars so as to move the wedges 79 along the wedge-plates, the latter being held stationary and serving merely to form a parallel surface for the wedges to act against. It will, however, be seen that the same result can be accomplished by causing the wedges and the wedge-plates to move along each other, and it is to be understood, therefore, that where the wedges and wedge-plates are herein referred to as being moved one with relation to the other, that is intended to include the movement of both as well as one. In such case the wedge-plates would of course be lengthened so as to be substantially duplicates of the justifying-wedges and would be provided with suitable connections by which they could be advanced the same as the wedges. Such an organization is illustrated in Fig. 37, in which the wedge-plates 82 are made substantial duplicates of the wedges 79. The wedge-plates 82 are carried upon arms 73, the same as in the organization shown in Figs. 31 to 34, and are arranged to be advanced by means of a plate 90$^a$, the same as in the organization first described. The wedges 79 are arranged and operated the same as in the organization shown in Figs. 31 to 34. By this means the wedges and wedge-plates can be advanced along each other, or either can be advanced along the other.

The wedge-plates 82, as before stated, serve to provide a parallel surface for the justifying-wedges 79 to act against during the operation of justifying the line, and this is an important feature of the justifying mechanism, and is in most cases necessary in order to make the mechanism practically successful. In some cases, however, it may be practicable to effect the justification without making the surfaces of the plates and wedges parallel, and in some cases the justification may be effected without the use of the wedge-plates, and in such case the justifying-wedges alone may be used to form the primary spaces and then be advanced between the words to increase the spaces and effect the justification. An organization of this character would be illustrated in Figs. 31 to 34 if the wedge-plates 82 and their arms 73 were omitted. The wedges 79 would, however, in such case, preferably be inclined on both sides.

What I claim is—

1. The combination of the type and mechanism, substantially as described, for assembling them in line, with justifying-wedges adapted to be introduced between the type to form the primary spaces and tapered to constantly increase the spaces between the type as they are advanced and to form justifying-spaces at every point of their advancement, and means, substantially as described, for introducing said wedges between the type to form the primary spaces, and for then advancing said wedges to effect the justification, all substantially as described.

2. The combination of the type and mechanism, substantially as described, for assembling them in line, with the justifying-wedges 79 and the wedge-plates 82 tapered in opposite directions and arranged to be inserted between the type to form the primary spaces and to then be advanced, one with relation to the other, so as to increase the spaces and effect the justification, substantially as described.

3. The combination of the type and mechanism, substantially as described, for assembling them in line, with the justifying-wedges 79 and the wedge-plates 82 arranged to be inserted between the type to form the primary spaces, and means, substantially as described, for advancing said wedges along said plates to increase the spaces and effect the justification, substantially as described.

4. The combination of the type and mechanism, substantially as described, for assembling them in line, with the justifying-wedges 79, the wedge-plates 82, carried by said wedges and arranged to be inserted with the wedges between the type to form the primary spaces, and means, substantially as described, for advancing said wedges along said plates to increase the spaces and effect the justification, substantially as described.

5. The combination of the type and mechanism, substantially as described, for assembling them in line, with the spreading-bars having justifying-wedges adapted to be introduced one by one between the type to form the primary spaces as they are required and tapered to constantly increase the spaces between the type as they are advanced and to form justifying-spaces at every point of their advancement, and means, substantially as described, for introducing said wedges between the type as the type are assembled to form the primary spaces, and for then simultaneously advancing said wedges to effect the justification, all substantially as described.

6. The combination of the type and mechanism, substantially as described, for assembling them in line, with a justifying mechanism consisting of the wedge-plates 82 and the spreading-bars 75, having the justifying-wedges 79, means, substantially as described, for operating the said plates and bars one by one to introduce them into the line as they are required to form the primary spaces, and means, substantially as described, for then advancing all of the bars which have been introduced into the line to increase the spacing and effect the justification, substantially as described.

7. The combination of the type and mechanism, substantially as described, for assembling them in line, with the justifying-bars A, consisting of the spreading-bars 75, having the justifying-wedges 79, and the wedge-plates 82, carried by said bars, substantially as described.

8. The combination of the type and mechanism, substantially as described, for assembling them in line, with the justifying-bars consisting of the spreading-bars 75, having the justifying-wedges 79, and the wedge-plates 82, carried by said bars, means, substantially as described, for operating the justifying-bars one by one as they are required to be inserted in the line to form the primary spaces for then simultaneously advancing all of the spreading-bars which have been inserted in the line and for simultaneously retracting all of the bars, substantially as described.

9. The combination of the type and mechanism, substantially as described, for assembling them in line, with the justifying-bars consisting of the spreading-bars 75, having the justifying-wedges 79, and the wedge-plates 82, carried by said spreading-bars and movable thereon, means, substantially as described, for operating said bars one by one to introduce them between the type to form the primary spaces for simultaneously advancing all of the spreading-bars which have been introduced into the line to effect the justification and for simultaneously retracting all of the bars and returning the plates to their normal position, substantially as described.

10. The combination, with the rest-bar 74, of the wedge-plates 82, having the projections 83, and the justifying-wedges 79, substantially as described.

11. The combination, with the spreading-bars 75, having the justifying-wedges 79, of the rest-bar 74 and the wedge-plates 82, carried by the spreading-bars and having the projections 83, substantially as described.

12. The combination, with the spreading-bars 75, having the justifying-wedges 79 and the shoulders 88, of the thrust-plate 90, rest-bar 74, and the wedge-plates 82, having the projections 83, substantially as described.

13. The combination, with the rest-bar 74 and the thrust-plate 90, of the spreading-bars 75, having the justifying-wedges 79 and the shoulders 88, and the wedge-plates 82, carried by said bars and having the projections 83, substantially as described.

14. The herein-described justifying mechanism consisting, essentially, of a spreading-bar 75, having a justifying-wedge 79 and a wedge-plate 82, said wedge and plate being tapered in opposite directions, substantially as described.

15. The combination, with the spreading-bars 75, having the justifying-wedges 79, of wedge-plates 82, having the tongue-pieces 81, arranged to be moved along said bars, substantially as described.

16. The combination, with the spreading-bars 75, having the justifying-wedges 79, of wedge-plates 82, having the tongue-pieces 81, arranged to move along said bars, and the detents 89, substantially as described.

17. The combination, with the justifying-wedges 79, having channels 78, of the wedge-plates 82, having the tongue-pieces 81, arranged to move in said channels, substantially as described.

18. The combination of the type and mechanism, substantially as described, for assembling them in line, with the spreading-bars 75, having the justifying-wedges 79 and the shoulders 88, the wedge-plates 82, having the tongue-pieces 81 and projections 83, the rest-bar 74, and the thrust-plate 90, substantially as described.

19. The combination, with the type or dies, of a series of two-part justifying devices, one part of each of which is movable, while the other part is locked in with the type or dies, and means for operating such justifying devices in series.

20. The combination of type or dies and mechanism, substantially as described, for assembling them in line, with a series of wedge-plates arranged to be inserted between the type or dies, another series of wedges, and means, substantially as described, for advancing the wedges along the wedge-plates.

21. A series of type or dies and supports therefor, combined with a series of wedges adapted to engage the supports and a second series of wedges connected by sliding joints to those first named.

22. The combination of type or dies and mechanism, substantially as described, for assembling them in line, with justifying-wedges and wedge-plates carried by said wedges and arranged to be inserted with the wedges between the type or dies to form the primary spaces, and means, substantially as described, for advancing said wedges along said plates.

23. The combination of a series of type or dies and means for moving them into operative position, with a plurality of movable justifying-spaces, each consisting of two parts movable one with respect to the other, a support for the dies in the operative position, and a contacting or thrust plate for adjusting the justifying-spaces.

24. The combination of spreading-bars having justifying-wedges and shoulders, with a thrust-plate engaging the shoulders.

In testimony whereof I have hereunto set my hand in the presence of two subscribing witnesses.

JACOBS W. SCHUCKERS.

Witnesses:
J. A. HOVEY,
JAS. J. KENNEDY.